US009285566B2

(12) United States Patent
Chan et al.

(10) Patent No.: US 9,285,566 B2
(45) Date of Patent: Mar. 15, 2016

(54) MIRROR TILT ACTUATION

(71) Applicant: Apple Inc., Cupertino, CA (US)

(72) Inventors: Ning Y. Chan, Palo Alto, CA (US); Richard J. Topliss, Campbell, CA (US); Steven Webster, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 14/043,655

(22) Filed: Oct. 1, 2013

(65) Prior Publication Data
US 2015/0042870 A1 Feb. 12, 2015

Related U.S. Application Data

(60) Provisional application No. 61/863,846, filed on Aug. 8, 2013.

(51) Int. Cl.
*G03B 19/12* (2006.01)
*G02B 13/00* (2006.01)
*H04N 5/232* (2006.01)
*G03B 5/00* (2006.01)
*G03B 17/17* (2006.01)
*G02B 27/64* (2006.01)
*G02B 7/10* (2006.01)
*G02B 7/182* (2006.01)
(Continued)

(52) U.S. Cl.
CPC ............ *G02B 13/009* (2013.01); *G02B 7/102* (2013.01); *G02B 7/1828* (2013.01); *G02B 26/0816* (2013.01); *G02B 27/646* (2013.01); *G03B 5/00* (2013.01); *G03B 17/17* (2013.01); *H04N 5/2257* (2013.01); *H04N 5/2328* (2013.01); *H04N 5/23296* (2013.01); *G03B 2205/0023* (2013.01)

(58) Field of Classification Search
USPC ................................... 396/354, 358
See application file for complete search history.

(56) References Cited

U.S. PATENT DOCUMENTS 3,852,791 A * 12/1974 Eukuda .................. 396/358
5,842,065 A * 11/1998 Nakano .................. 396/358
(Continued)

FOREIGN PATENT DOCUMENTS

JP 2006243234 9/2006

OTHER PUBLICATIONS

International Search Report and Written Opinion from PCT/US2014/050153, mailed Nov. 21, 2014, Apple Inc., pp. 1-12.

*Primary Examiner* — Clayton E LaBalle
*Assistant Examiner* — Warren K Fenwick
(74) *Attorney, Agent, or Firm* — Robert C. Kowert; Meyertons, Hood, Kivlin, Kowert & Goetzel, P.C.

(57) ABSTRACT

Some embodiments include an image sensor and a zoom lens assembly including a plurality of movable lens elements arranged to be moved independent of one another. In some embodiments, the plurality of movable lens elements share an optical axis. Some embodiments include a lens and mirror assembly for admitting light to the miniature camera. The lens and mirror assembly includes a folded optics arrangement such that light enters the lens and mirror assembly through a first lens with an optical axis of the first lens orthogonal to the plurality of moveable lens elements. The lens and mirror assembly includes a mirror for folding the path of light from the optical axis of the first lens to the optical axis of the plurality of movable lens elements, and the lens and mirror assembly further includes an actuator for tilting the mirror.

20 Claims, 32 Drawing Sheets

(51) Int. Cl.
*G02B 26/08* (2006.01)
*H04N 5/225* (2006.01)

(56) References Cited

U.S. PATENT DOCUMENTS

| | | | |
|---|---|---|---|
| 7,136,547 B2* | 11/2006 | Brown et al. | 385/16 |
| 7,170,690 B2 | 1/2007 | Ophey | |
| 7,430,366 B2* | 9/2008 | Togawa | 396/53 |
| 7,869,702 B2* | 1/2011 | Hayashi | G03B 5/00 348/208.11 |
| 7,983,545 B2* | 7/2011 | Maeda | G03B 17/00 348/208.11 |
| 8,134,589 B2 | 3/2012 | Border et al. | |
| 8,243,250 B2* | 8/2012 | Yamamiya | G03B 17/00 349/200 |
| 8,259,184 B2* | 9/2012 | Murashima et al. | 348/208.99 |
| 8,351,771 B2* | 1/2013 | Ito | G02B 7/023 359/554 |
| 8,446,672 B2* | 5/2013 | Omi | G02B 27/646 359/554 |
| 2004/0141065 A1 | 7/2004 | Hara et al. | |
| 2005/0200713 A1 | 9/2005 | Uenaka et al. | |
| 2006/0268431 A1 | 11/2006 | Jin | |
| 2007/0035631 A1* | 2/2007 | Ueda | G03B 5/00 348/208.99 |
| 2008/0169891 A1* | 7/2008 | Umeda et al. | 335/229 |
| 2010/0231870 A1* | 9/2010 | Chikaoka et al. | 353/85 |
| 2010/0321494 A1* | 12/2010 | Peterson et al. | 348/143 |
| 2012/0128339 A1 | 5/2012 | Hu | |
| 2013/0016428 A1 | 1/2013 | Sugawara et al. | |
| 2013/0128360 A1 | 5/2013 | Minamisawa et al. | |

* cited by examiner

```
  Tilt mirror
     2600
```

FIG. 26A

```
Receive input representing
motion of an image capture
        device
         2610
           │
           ▼
      Tilt mirror
         2620
```

FIG. 26B

MIRROR TILT ACTUATION

CLAIM OF PRIORITY

This application claims benefit of priority of U.S. Provisional Application Ser. No. 61/863,846 entitled "System and Method for Mirror Tilt Actuation" filed Aug. 8, 2013, the content of which is incorporated by reference herein in its entirety and for all purposes.

BACKGROUND

1. Technical Field

This disclosure relates generally to cameras, and, more specifically, to mirror tilt actuation in cameras.

2. Description of the Related Art

Miniature cameras are typically used in mobile devices such as cellphones and other multifunction devices. In such devices, space is a premium and every effort is made to minimize the camera size. A zoom lens is a lens where the lens elements can be moved relative to one another to change the focal length of the lens. In doing so, this changes the field of view of the lens. In addition, such a lens is most typically required to adjust focus for different object distances. Many different configurations of zoom lens are possible. However, for a typical optical zoom lens, there are at least two lens groups that move independently of each other along the optical axis relative to the image sensor, but in a relational manner to each other. There are additionally typically further lens groups that remain stationary relative to the image sensor.

In multifunction devices, the image captured by the image capture device or camera is frequently of lower quality due to the shaking of the user's hand. Optical image stabilization (OIS) has been attempted to compensate for this phenomenon. OIS adjusts the direction of the field of view of the camera to compensate for user motion. There have been various schemes proposed for miniature cameras, including: 'lens barrel shift,' in which the complete lens is moved in directions orthogonal to the optical axis relative to the image sensor; and 'camera tilt,' in which the lens and image sensor are together tilted relative to a support structure. For cameras and image capture devices in multifunction devices, neither method is practical.

SUMMARY OF EMBODIMENTS

Systems and methods for mirror tilt actuation are disclosed. Some embodiments include an image sensor and a zoom lens assembly including a plurality of movable lens elements arranged to be moved independent of one another. In some embodiments, the plurality of movable lens elements share an optical axis. Some embodiments include a lens and mirror assembly for admitting light to the miniature camera. The lens and mirror assembly includes a folded optics arrangement such that light enters the lens and mirror assembly through a first lens with an optical axis of the first lens orthogonal to the plurality of moveable lens elements. The lens and mirror assembly includes a mirror for folding the path of light from the optical axis of the first lens to the optical axis of the plurality of movable lens elements, and the lens and mirror assembly further includes an actuator for tilting the mirror.

BRIEF DESCRIPTION OF THE DRAWINGS

FIG. 26A is a flow diagram illustrating one embodiment of a method for mirror tilt actuation.

FIG. 26B is a flow diagram illustrating one embodiment of a method for mirror tilt actuation.

Figure 1:
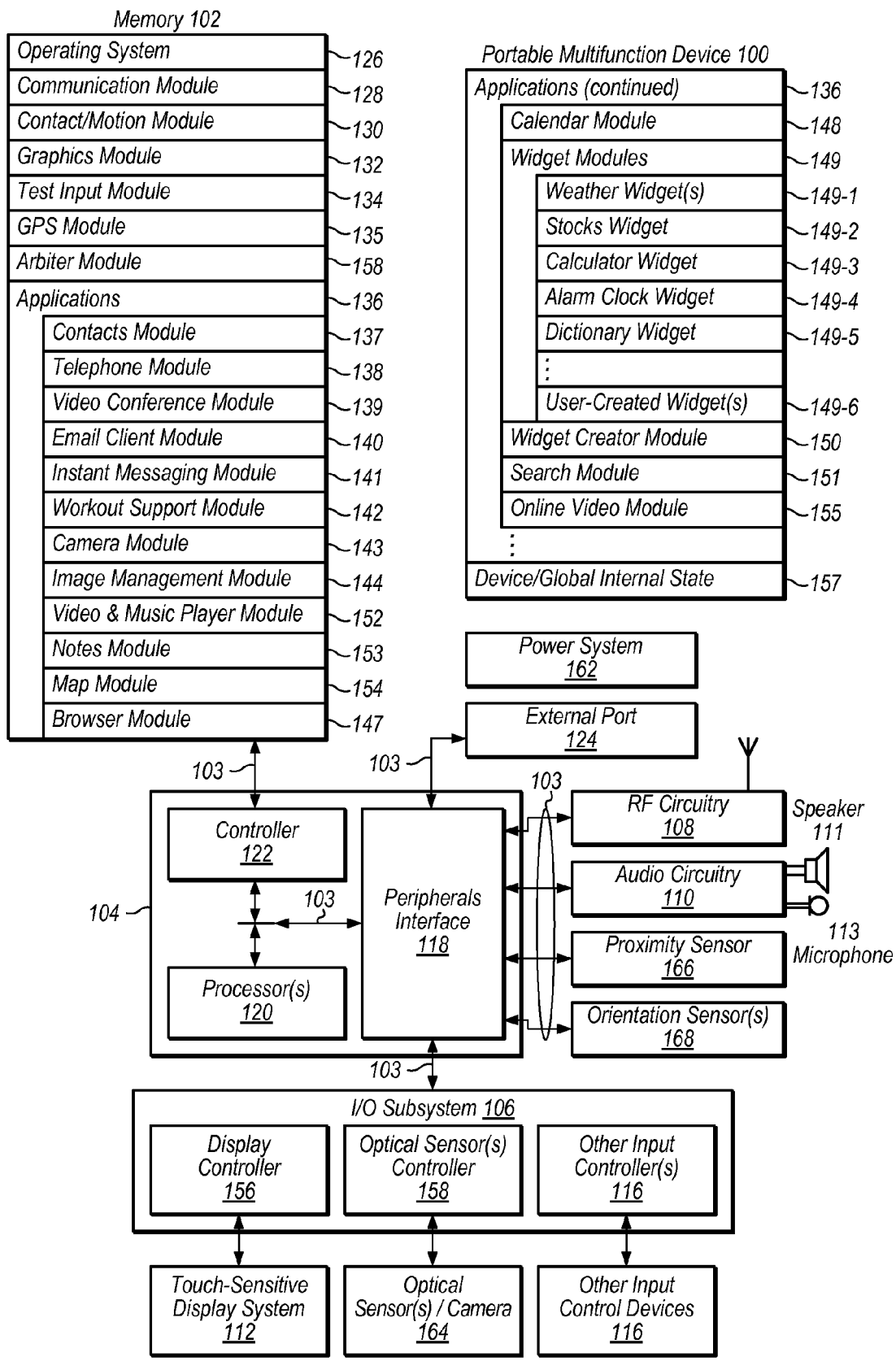
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for mirror tilt actuation are disclosed. Some embodiments include a plurality of lens elements, a mirror for adjusting an optical path of light passing through the lens elements, and an actuator for tilting the mirror. In some embodiments, the actuator for tilting the mirror includes an actuator synchronized to compensate for user hand motion to stabilize an image generated from the light and improve quality of the image.

In some embodiments, the actuator for tilting the mirror comprises an actuator synchronized to compensate for user hand motion. In some embodiments, the actuator includes a moveable magnet, and a plurality of stationary coils disposed around sides of the magnet. In some embodiments, the actuator is configured to receive electrical signals causing generation of Lorentz forces that tend to tilt the magnet and mirror. In some embodiments the actuator is configured to receive electrical signals causing generation of Lorentz forces that tend to tilt the magnet and mirror about a pivot in two substantially orthogonal tilt degrees of freedom. In some embodiments, a fringing field of the magnet includes components of magnetic field in the appropriate directions to deliver Lorentz forces, such that when the coils are electrically driven, said fringing field interacts with the coils at levels on average in different directions for each coil.

Some embodiments include a miniature camera with a folded optics arrangement, in which plural lens element have their optical axes orthogonal to a first lens element through which light entering the camera first passes. A mirror is used to fold the optical path. An actuator is used to tilt the mirror in an appropriate manner to compensate for user hand motion to stabilize the image and improve image quality.

In some embodiments, the actuator used for tilting the mirror includes a moving magnet, with four non-moving coils disposed around four sides of the magnet to, when driven with appropriate electric signals, generate Lorentz forces that tend to tilt the magnet and mirror about a pivot in two substantially orthogonal tilt degrees of freedom.

In some embodiments, the fringing field of the magnet includes components of magnetic field in the appropriate directions to deliver the required Lorentz forces, when the coils are electrically driven. The fringing fields that interact with the coils are on average in different directions for each coil.

In some embodiments, the four coils are fabricated in a single component layer-by-layer in sheet form using various process including plating.

In some embodiments, the actuator for tilting the mirror further includes at least two hall sensors for monitoring the motion of the magnet in two orthogonal directions. In some embodiments, the actuator for tilting the mirror further includes a resilient spring that acts to return the magnet assembly including mirror to its center position, and hence acts to convert the Lorentz forces from the coils to steady state positions.

Some embodiments include a method for mirror tilt actuation. In some embodiments, the method includes tilting a mirror for adjusting an optical path of light passing through lens elements of the image capture device. In some embodiments, tilting the mirror for adjusting the optical path of the light includes adjusting the optical path of the light to compensate for user hand motion to stabilize an image generated from the light and improve quality of the image.

In some embodiments, tilting the mirror for adjusting the optical path of the light comprises creating electrical signals for generation of Lorentz forces that tend to tilt the magnet and mirror. In some embodiments, tilting the mirror for adjusting the optical path of the light comprises creating electrical signals for generation of Lorentz forces that tend to tilt the magnet and mirror about a pivot in two substantially orthogonal tilt degrees of freedom. In some embodiments, tilting the mirror for adjusting the optical path of the light comprises driving coils such that a fringing field of the magnet interacts with the coils at levels on average in different directions for each coil. In some embodiments, the method further includes predicting a displacement of an image capture device. In some embodiments, the method further includes measuring a displacement of an image capture device.

Some embodiments may include a means for mirror tilt actuation. For example, a mirror tilt actuation module may tilt a mirror for adjusting an optical path of light passing through lens elements of the image capture device, as described herein. The mirror tilt actuation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to tilt a mirror for adjusting an optical path of light passing through lens elements of the image capture device, as described herein. Other embodiments of an mirror tilt actuation module may be at least partially implemented by hardware circuitry and/or firmware stored, for example, in a non-volatile memory.

Some embodiments enable an image capture device to tilt such a mirror to deliver the Optical Image Stabilization (OIS) function. The mirror tilt approach of the presented embodiments somewhat avoids adding the perspective distortion inherent in the lens shift approaches. This approach also has the advantage of reducing the space taken up by the OIS actuator.

Some embodiments include a camera. In some embodiments, the camera includes an image sensor, and a zoom lens assembly including a plurality of movable lens elements arranged to be moved independent of one another. In some embodiments, the plurality of movable lens elements share an optical axis. Some embodiments include a lens and mirror assembly for admitting light to the miniature camera. The lens and mirror assembly includes a folded optics arrangement such that light enters the lens and mirror assembly through a first lens with an optical axis of the first lens orthogonal to the plurality of moveable lens elements. The lens and mirror assembly includes a mirror for folding the path of light from the optical axis of the first lens to the optical axis of the plurality of movable lens elements, and the lens and mirror assembly further includes an actuator for tilting the mirror.

In some embodiments, the actuator is attached to a driver circuit for tilting the mirror to compensate for user hand motion. In some embodiments the actuator is attached to a driver circuit for tilting the mirror to stabilize an image captured by the image sensor. In some embodiments, the actuator used for tilting the mirror includes a moving magnet, and four non-moving coils disposed around four sides of the magnet. When driven with electric signals, the four non-moving coils generate Lorentz forces that tend to tilt the magnet and the mirror.

In some embodiments, the actuator used for tilting the mirror includes a moving magnet, and four non-moving coils disposed around four sides of the magnet. When driven with electric signals, the four non-moving coils generate Lorentz forces that tend to tilt the magnet and the mirror about a pivot.

In some embodiments, the actuator used for tilting the mirror includes a moving magnet, and four non-moving coils disposed around four sides of the magnet. When driven with electric signals, the four non-moving coils generate Lorentz forces that tend to tilt the magnet and the mirror about a pivot. In some embodiments, the fringing field of the moving magnet includes components of magnetic field in the appropriate directions to deliver the Lorentz forces, when the coils are electrically driven, wherein said fringing field that interact with the coils are on average in different directions for each coil.

In some embodiments, a system includes a plurality of lens elements, a mirror for adjusting an optical path of light passing through the lens elements, and an actuator for tilting the mirror. In some embodiments, the actuator used for tilting the mirror includes a moving magnet, and four non-moving coils disposed around four sides of the magnet. When driven with electric signals, the four non-moving coils generate Lorentz forces that tend to tilt the magnet and the mirror about a pivot. In some embodiments, the four coils are fabricated in a single component layer-by-layer in sheet form using various process including plating.

In some embodiments, the actuator for tilting the mirror further comprises at least two hall sensors for monitoring the motion of the magnet in two orthogonal directions. In some embodiments, the actuator for tilting the mirror further comprises a resilient spring that acts to return the magnet assembly including mirror to its center position, and hence acts to convert the Lorentz forces from the coils to steady state positions. In some embodiments, the actuator for tilting the mirror includes an actuator synchronized to compensate for user hand motion to stabilize an image generated from the light and improve quality of the image. In some embodiments, the actuator for tilting the mirror comprises an actuator synchronized to compensate for user hand motion.

In some embodiments, the actuator includes a moveable magnet, and a plurality of stationary coils disposed around sides of the magnet. In some embodiments, the actuator is configured to receive electrical signals causing generation of Lorentz forces that tend to tilt the magnet and mirror. In some embodiments, is configured to be receiving electrical signals causing generation of Lorentz forces that tend to tilt the magnet and mirror about a pivot in two substantially orthogonal tilt degrees of freedom. In some embodiments, a fringing field of the magnet includes components of magnetic field in the appropriate directions to deliver Lorentz forces, such that when the coils are electrically driven, said fringing field interacts with the coils at levels on average in different directions for each coil.

Some embodiments include a method for operating camera components. The method includes receiving input representing motion of an image capture device, and tilting a mirror for adjusting an optical path of light passing through lens elements of the image capture device to compensate for the motion.

Some embodiments include non-transitory, computer-readable storage medium, storing program instructions executable on a computer to implement receiving input representing motion of an image capture device, and tilting a mirror for adjusting an optical path of light passing through lens elements of the image capture device to compensate for the motion.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102.

The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED))

and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video module and a music module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource of an automobile. A request for control of a shared audio or visual resource of the vehicle is received at arbiter module 158. Arbiter module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by arbiter module 158 based at least in part on the request for control and the ownership transition conditions. The new state information indicates which of the processes controls output of the shared audio or visual resource of the vehicle. New ownership transition conditions of the shared audio or visual resource are determined by arbiter module 158 and communicated to a controller interface of the shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
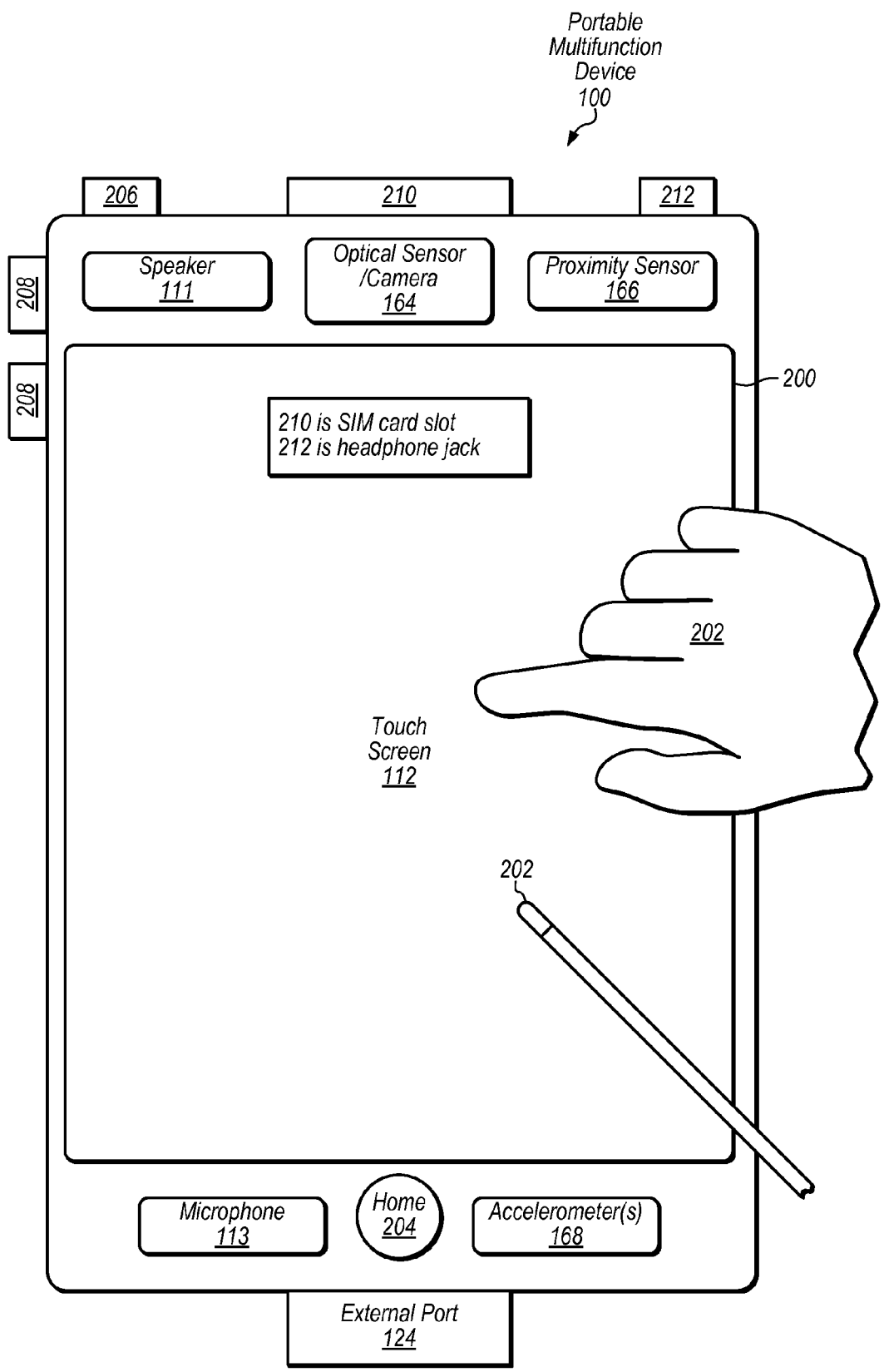
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Example Camera Hardware

Figure 3A:
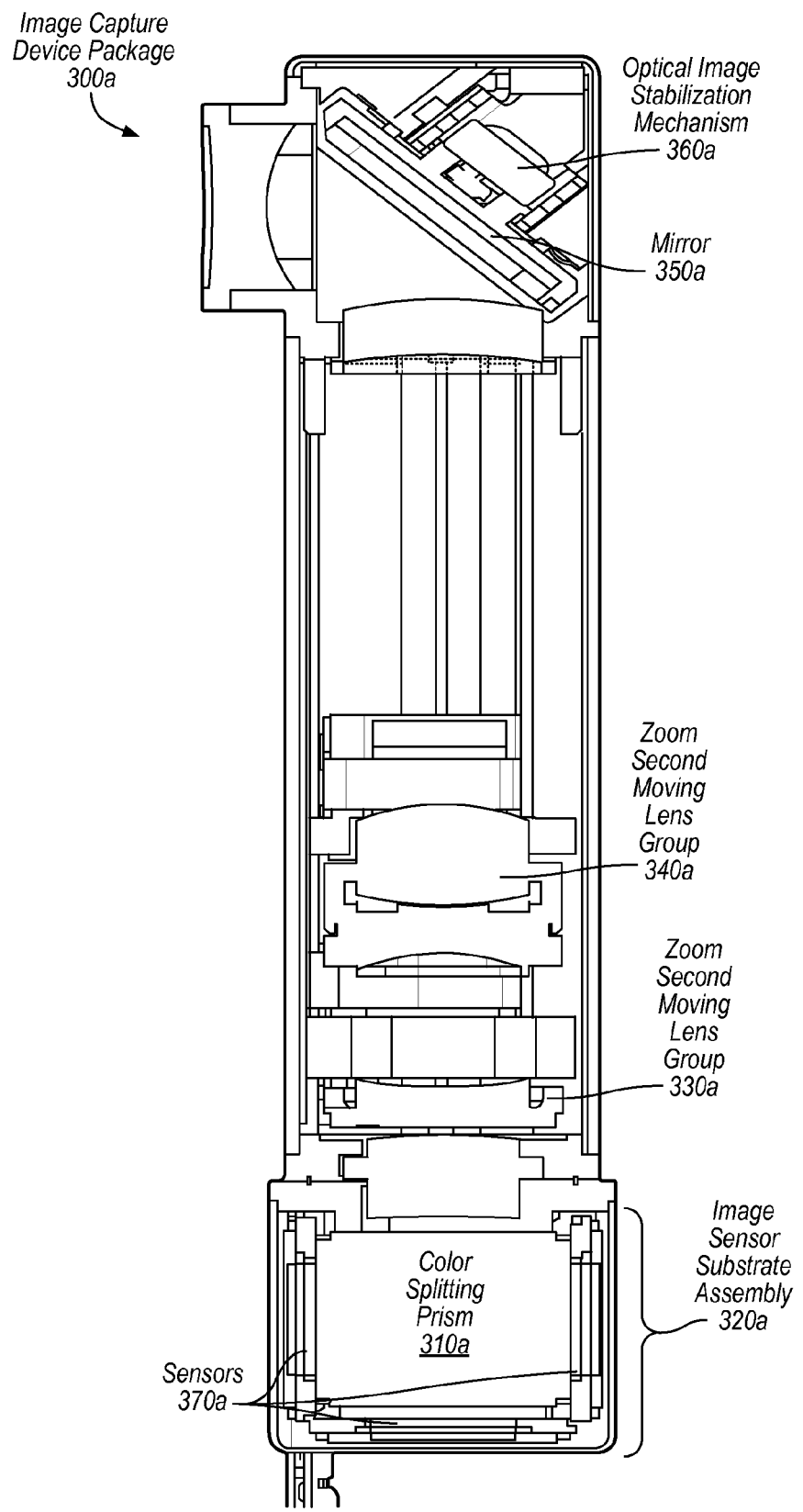
FIG. 3A illustrates a camera for use with in portable multifunction device in accordance with some embodiments.

FIG. 3A illustrates a camera for use with in portable multifunction device in accordance with some embodiments. FIG. 3A shows a cross-sections through the optical stack of the camera (image capture device package 300a), including a color-splitting prism 310a, an image sensor substrate assembly 310a, a zoom second moving lens group 330a, a zoom first moving lens group 340a, a mirror 350a and an optical image stabilization mechanism 360a. FIG. 3A shows zoom second moving lens group 330a and zoom first moving lens group 340a in a first position for a zoom lens ratio. Mirror 350a is used to fold the optics, and is nominally mounted at 45 degrees to the optical axis of all the lens elements. FIG. 3A also illustrates the triangular section into which optical image stabilization mechanism 360a to tilt mirror 350a is fitted. As can be observed in FIG. 3A, the substrate assembly 320a is made up of three image sensors 370a and a prism 310a, which splits the light into three color components, directing one color to each image sensor. This tri-sensor arrangement is very efficient as little light is wasted in color filters, and hence minimizes the lens size for a given combined image sensor surface area.

Figure 3B:
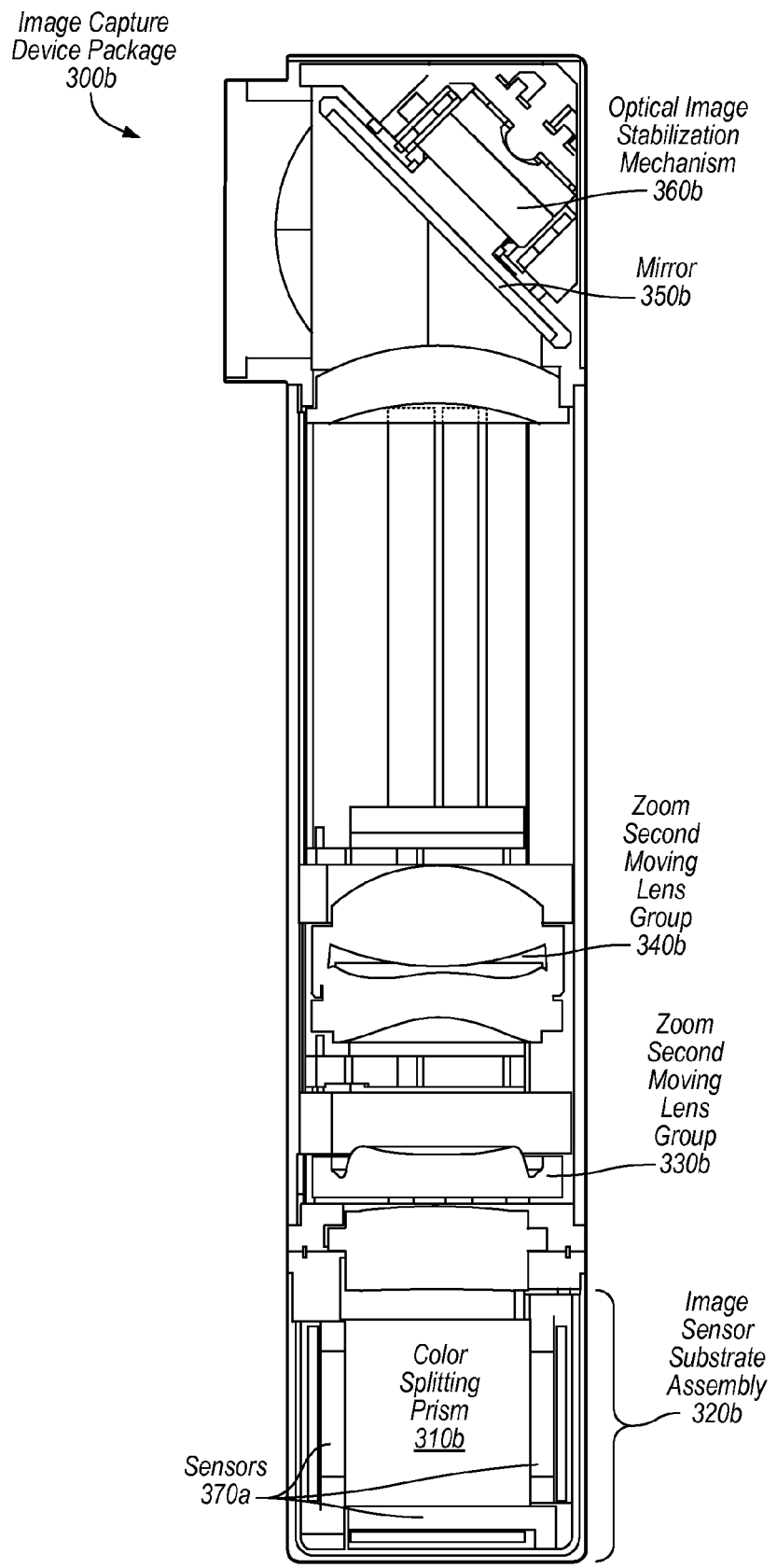
FIG. 3B illustrates an alternative embodiment of a camera for use with in a portable multifunction device in accordance with some embodiments.

FIG. 3B illustrates an alternative embodiment of a camera for use with in portable multifunction device in accordance with some embodiments. FIG. 3B shows a cross-sections through the optical stack of the camera (image capture device package 300b), including a color-splitting prism 310b, an image sensor substrate assembly 310b, a zoom second moving lens group 330b, a zoom first moving lens group 340b, a mirror 350b and an optical image stabilization mechanism 360b. FIG. 3B shows zoom second moving lens group 330b and zoom first moving lens group 340b in a first position for a zoom lens ratio. Mirror 350b is used to fold the optics, and is nominally mounted at 45 degrees to the optical axis of all the lens elements. FIG. 3B also illustrates the triangular section into which optical image stabilization mechanism 360b to tilt mirror 350b is fitted. As can be observed in FIG. 3B, the substrate assembly 320b is made up of three image sensors 370b and a prism 310b, which splits the light into three color components, directing one color to each image sensor. This tri-sensor arrangement is very efficient as little light is wasted in color filters, and hence minimizes the lens size for a given combined image sensor surface area.

Figure 4:
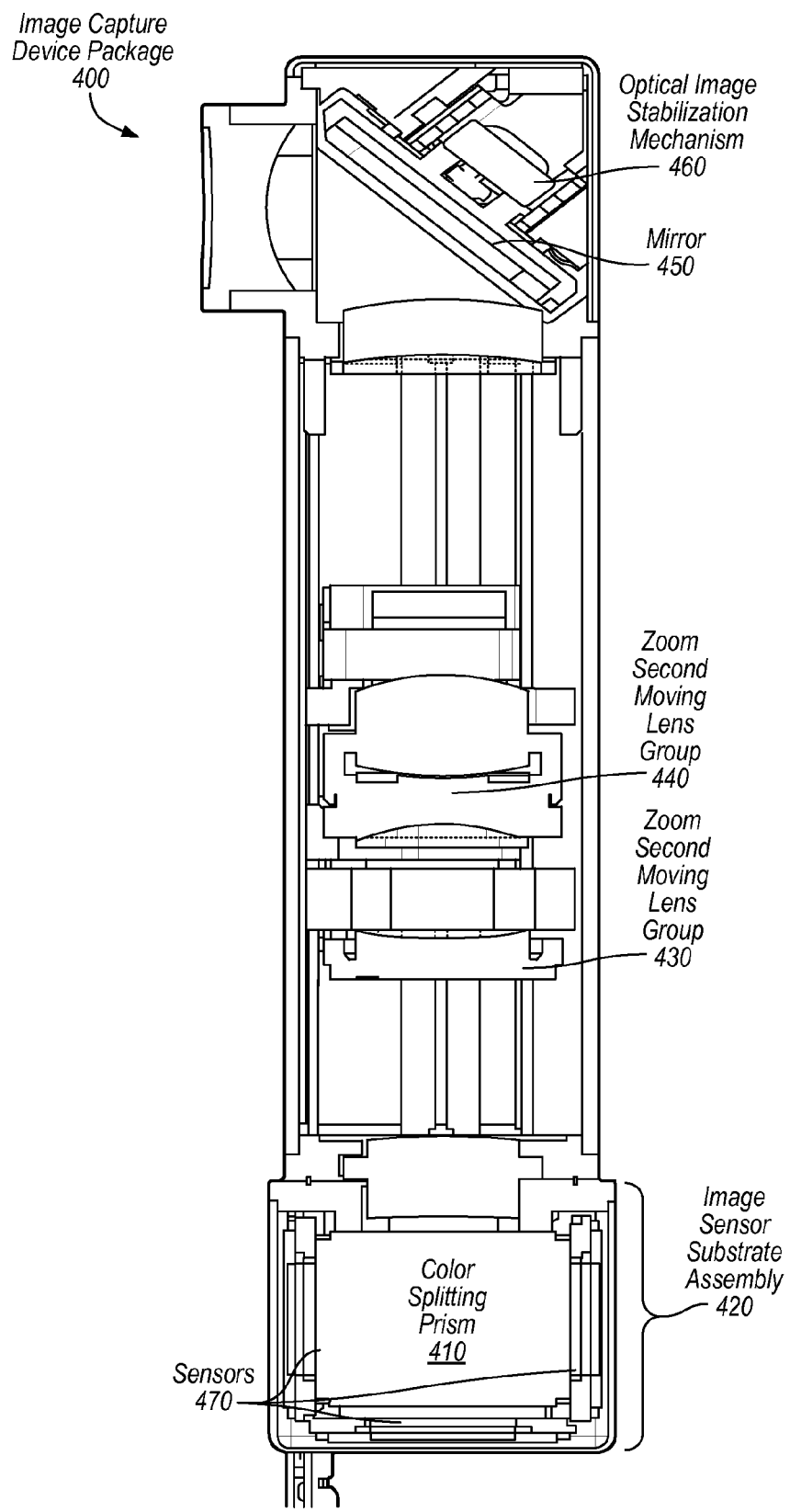
FIG. 4 depicts a camera for use with in portable multifunction device in accordance with some embodiments.

FIG. 4 depicts a camera for use with in portable multifunction device in accordance with some embodiments. FIG. 4 shows a cross-sections through the optical stack of the camera (image capture device package 400), including a color-splitting prism 410, an image sensor substrate assembly 420, a zoom second moving lens group 430, a zoom first moving lens group 440, a mirror 450 and an optical image stabilization mechanism 460. FIG. 4 shows zoom second moving lens group 430 and zoom first moving lens group 440 in a second position for a zoom lens ratio. Mirror 450 is used to fold the optics, and is nominally mounted at 45 degrees to the optical axis of all the lens elements. FIG. 4 also illustrates the triangular section into which optical image stabilization mechanism 460 to tilt mirror 450 is fitted. As can be observed in FIG. 4, the substrate assembly 420 is made up of three image sensors 470 and a prism 410, which splits the light into three color components, directing one color to each image sensor. This tri-sensor arrangement is very efficient as little light is wasted in color filters, and hence minimizes the lens size for a given combined image sensor surface area.

Figure 5:
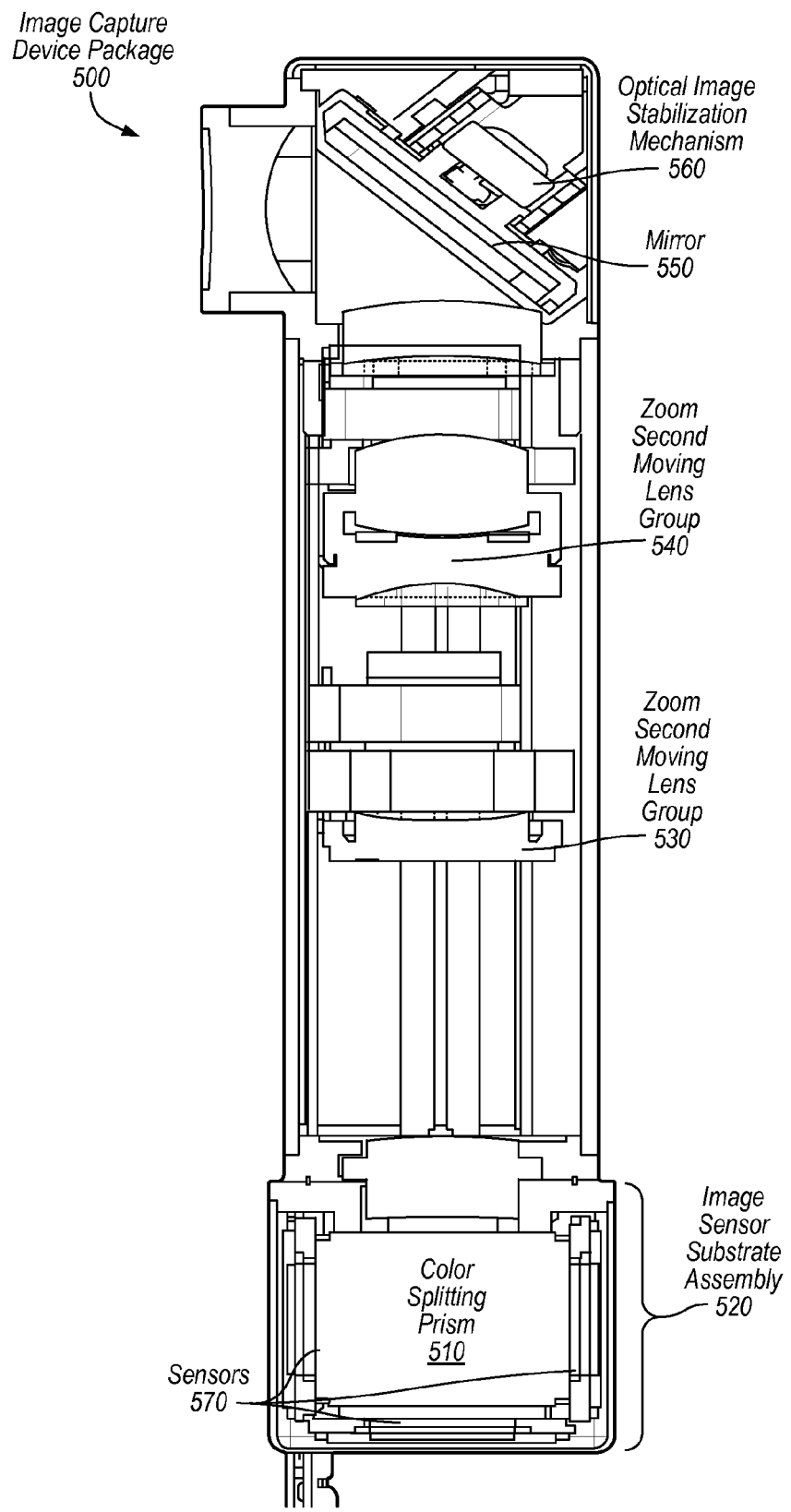
FIG. 5 illustrates a camera for use with in portable multifunction device in accordance with some embodiments.

FIG. 5 illustrates a camera for use with in portable multifunction device in accordance with some embodiments. FIG. 5 shows a cross-sections through the optical stack of the camera (image capture device package 500), including a color-splitting prism 510, an image sensor substrate assembly 520, a zoom second moving lens group 530, a zoom first moving lens group 540, a mirror 550 and an optical image stabilization mechanism 560. FIG. 5 shows zoom second moving lens group 530 and zoom first moving lens group 540 in a first position for a zoom lens ratio. Mirror 550 is used to fold the optics, and is nominally mounted at 45 degrees to the optical axis of all the lens elements. FIG. 5 also illustrates the triangular section into which optical image stabilization mechanism 560 to tilt mirror 550 is fitted. As can be observed in FIG. 5, the substrate assembly 520 is made up of three image sensors 570 and a prism 510, which splits the light into three color components, directing one color to each image sensor. This tri-sensor arrangement is very efficient as little light is wasted in color filters, and hence minimizes the lens size for a given combined image sensor surface area.

Figure 6:
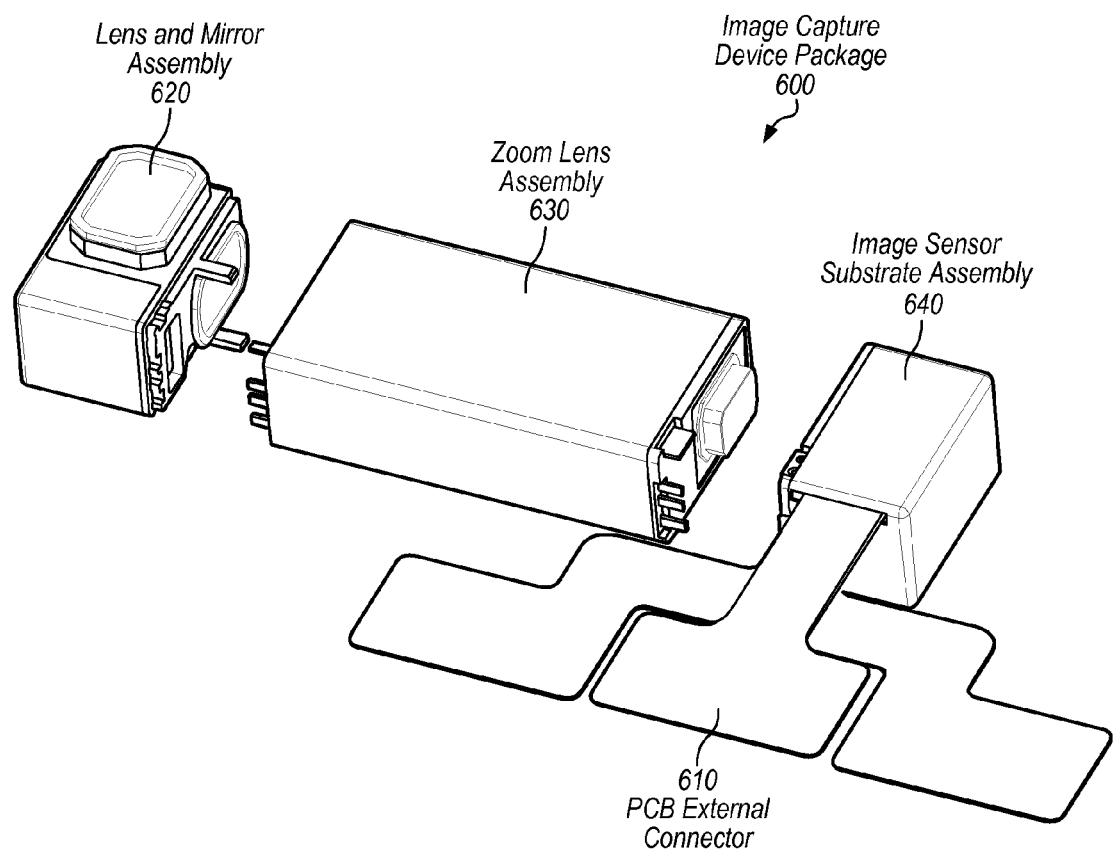
FIG. 6 depicts components of a camera for use with in portable multifunction device in accordance with some embodiments.

FIG. 6 depicts components of a camera for use with in portable multifunction device in accordance with some embodiments. A lens and mirror assembly 620, a zoom lens assembly 630, and an image sensor assembly are shown as components of an image capture device package 600, which connects to other components of a multifunction device by means of a PCB external connector 610.

Figure 7:
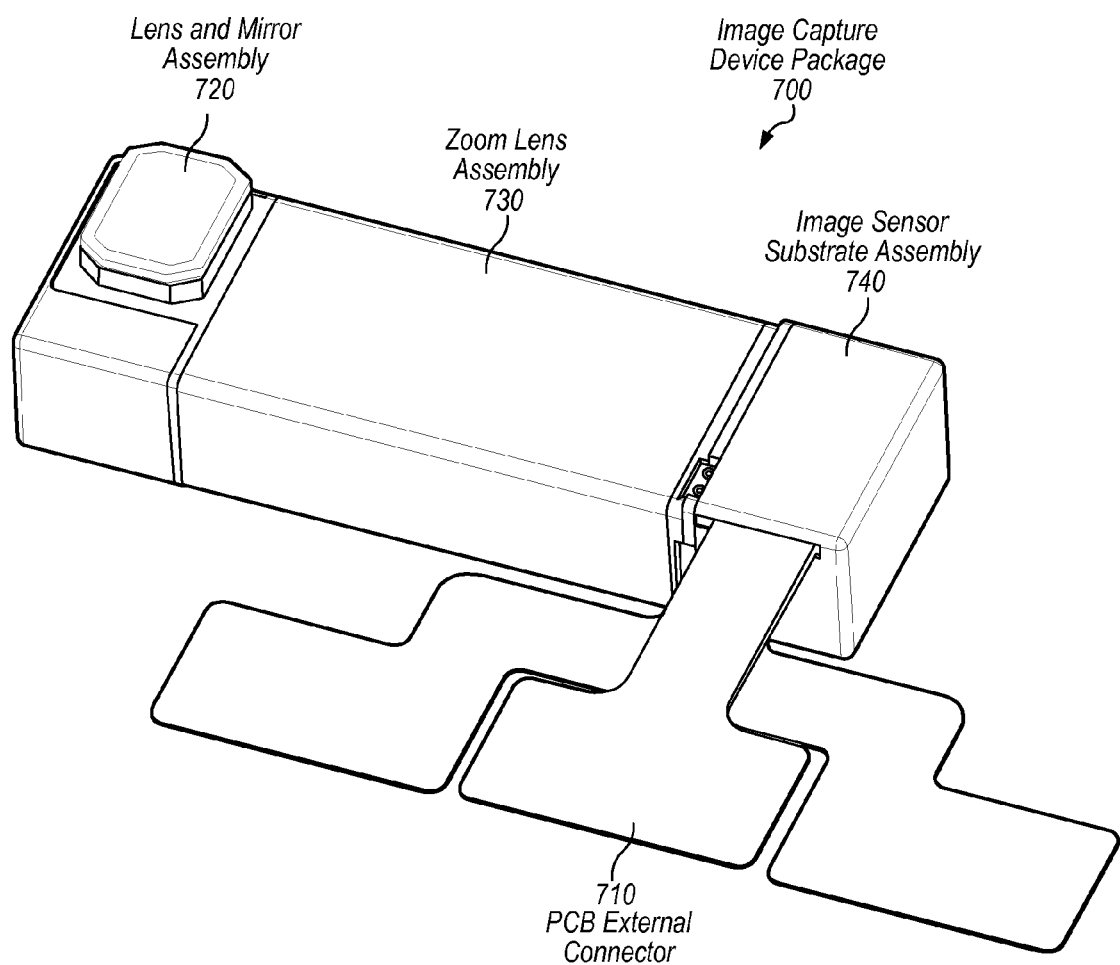
FIG. 7 illustrates a camera for use with in portable multifunction device in accordance with some embodiments.

FIG. 7 illustrates a camera for use with in portable multifunction device in accordance with some embodiments. A lens and mirror assembly 720, a zoom lens assembly 730, and an image sensor assembly are shown as components of an image capture device package 700, which connects to other components of a multifunction device by means of a PCB external connector 710. In some embodiments image capture device package 700 has dimensions X=28.5 mm, Y=8.45 mm, Z=5.7 mm, and Z=6.8 mm where the lens emerges. Note that the camera is generally thin in Z, minimally wide in Y, but long in X. Whilst in general, size for the camera should be minimized when used in mobile devices, these dimensions are consistent with the an embodiment of design constraints, where minimizing Z is most important, Y is important, and X is relatively less important.

Figure 8:
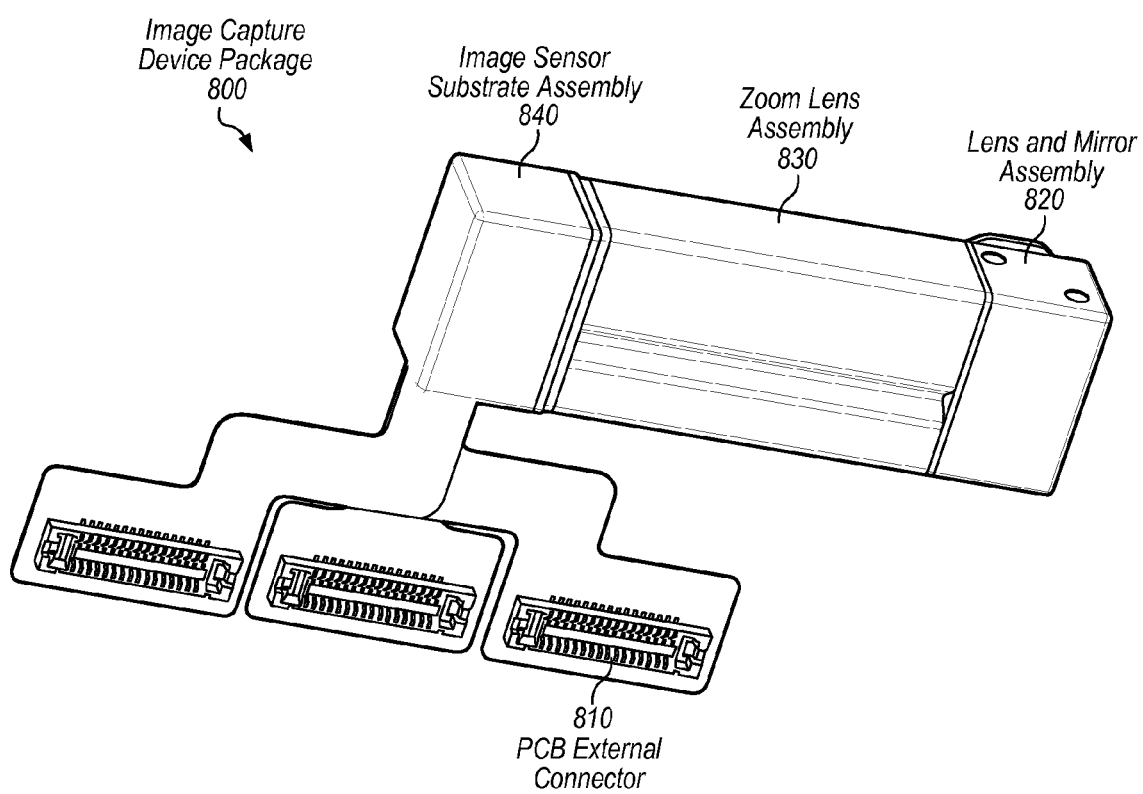
FIG. 8 depicts a camera for use with in portable multifunction device in accordance with some embodiments.

FIG. 8 depicts a camera for use with in portable multifunction device in accordance with some embodiments. A lens and mirror assembly 820, a zoom lens assembly 830, and an image sensor assembly are shown as components of an image capture device package 800, which connects to other components of a multifunction device by means of a PCB external connector 810. In some embodiments image capture device package 800 has dimensions X=28.5 mm, Y=8.45 mm, Z=5.7 mm, and Z=6.8 mm where the lens emerges. Note that the camera is generally thin in Z, minimally wide in Y, but long in X. Whilst in general, size for the camera should be minimized when used in mobile devices, these dimensions are consistent with the an embodiment of design constraints, where minimizing Z is most important, Y is important, and X is relatively less important.

Figure 9A:
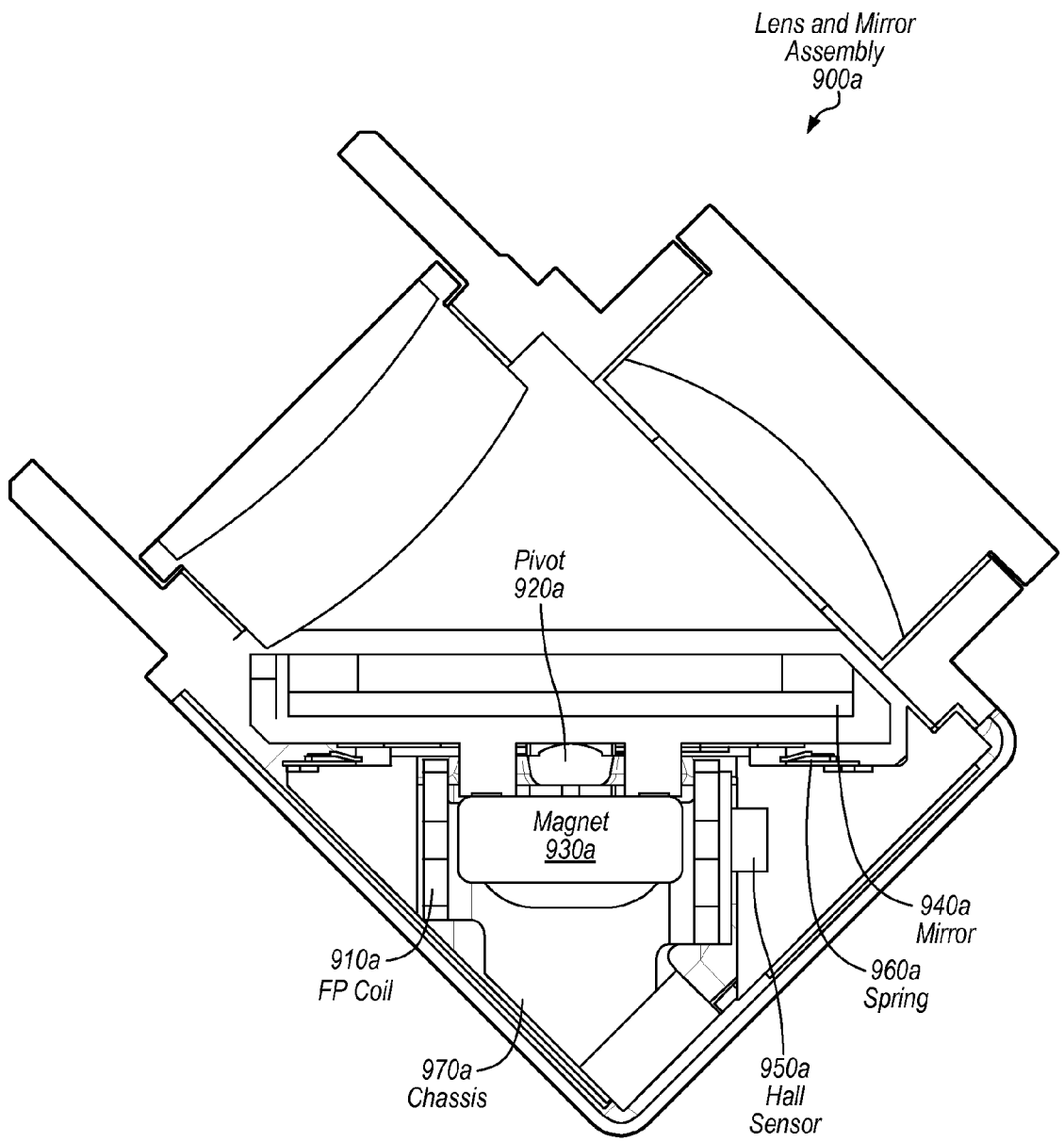
FIG. 9A illustrates a cross-sectional view of components of a lens and mirror assembly for a camera for use with in portable multifunction device in accordance with some embodiments.

FIG. 9A illustrates a cross-sectional view of components of a lens and mirror assembly for a camera for use with in portable multifunction device in accordance with some embodiments. Lens and mirror assembly 900a includes an FP coil 910a, a pivot 920a, a magnet 930a, a mirror 940a and a hall sensor 950a. FIG. 9A shows a cross-sectional view through the lens and mirror assembly 900a assembly, showing the OIS actuator architecture. Magnet 930a is configured to move with the mirror 940a. The lens and mirror assembly 900a incorporates a pivot point 920a about which the mirror 940a tilts, and includes a resilient spring 960a to convert the force for the VCM actuators to a position of the mirror 940a. There are four coils 910a mounted to the fixed OIS chassis 970a portion of the assembly 900a. These are disposed around the four sides of the magnet. When appropriately driven with electrical signals, the Lorentz forces generated between the coils 910a and magnet 930a generate the tilting forces.

Figure 9B:
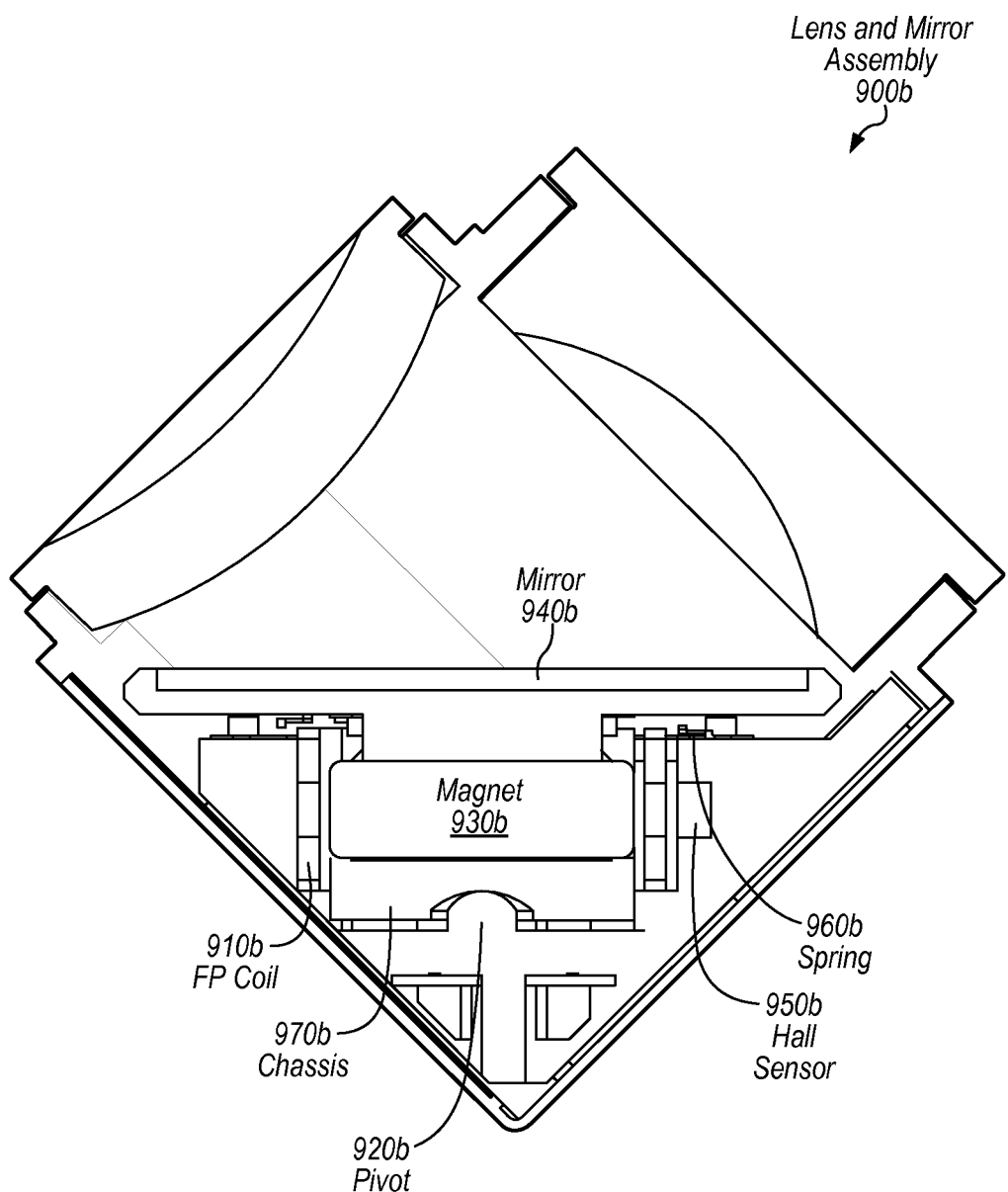
FIG. 9B illustrates a cross-sectional view of components of an alternative embodiment of a lens and mirror assembly for a camera for use with in portable multifunction device in accordance with some embodiments.

FIG. 9B illustrates a cross-sectional view of components of an alternative embodiment of a lens and mirror assembly for a camera for use with in portable multifunction device in accordance with some embodiments. Lens and mirror assembly 900b includes an FP coil 910b, a pivot 920b, a magnet 930b, a mirror 940b and a hall sensor 950b. FIG. 9B shows a cross-sectional view through the lens and mirror assembly 900b assembly, showing the OIS actuator architecture. Magnet 930b is configured to move with the mirror 940b. The lens and mirror assembly 900b incorporates a pivot point 920b about which the mirror 940b tilts, and includes a resilient spring 960b to convert the force for the VCM actuators to a position of the mirror 940b. There are four coils 910b mounted to the fixed OIS chassis 970b portion of the assembly 900b. These are disposed around the four sides of the magnet. When appropriately driven with electrical signals, the Lorentz forces generated between the coils 910b and magnet 930b generate the tilting forces.

Figure 10A:
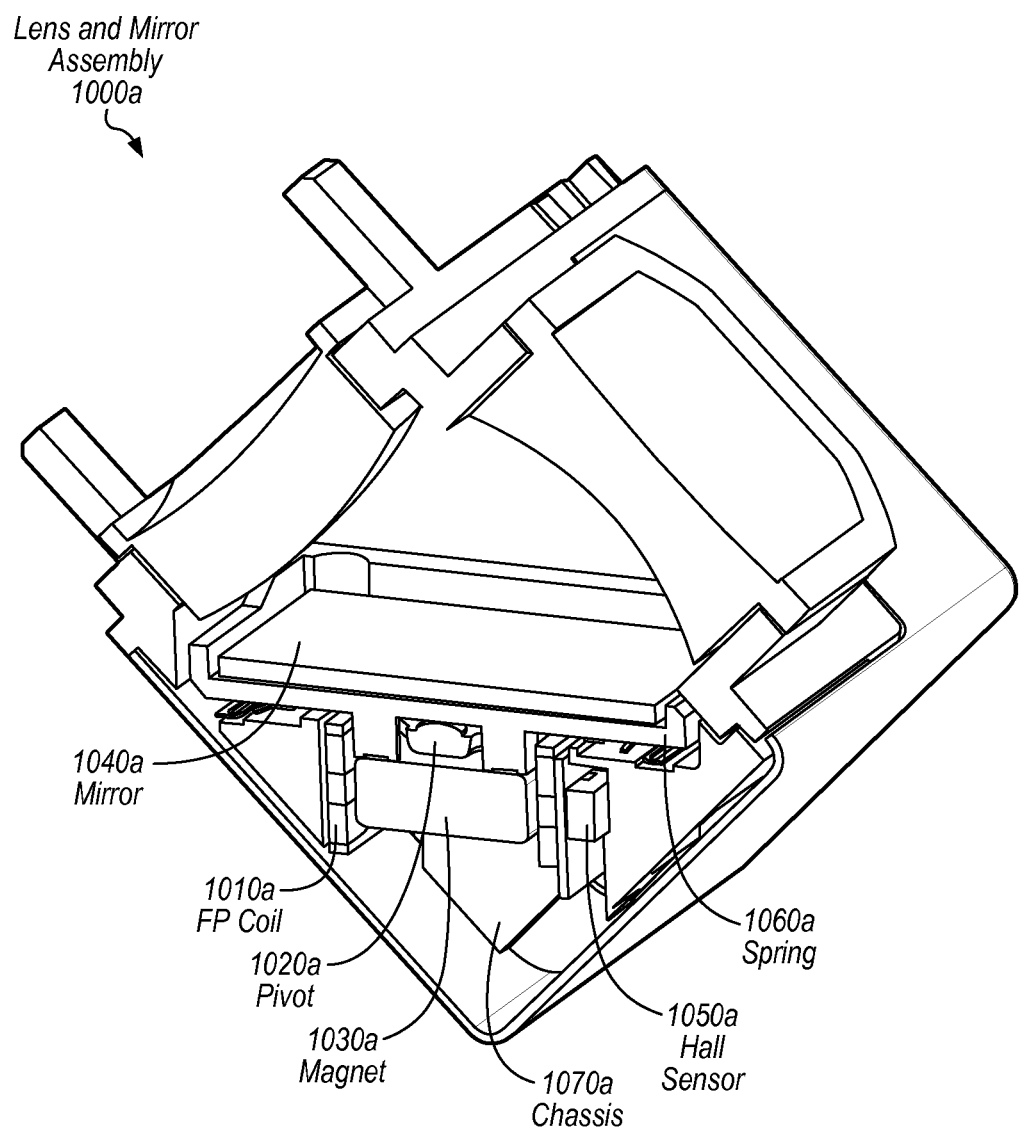
FIG. 10A depicts a cross-sectional view of components of a lens and mirror assembly for a camera for use with in portable multifunction device in accordance with some embodiments.

FIG. 10A depicts a cross-sectional view of components of a lens and mirror assembly for a camera for use with in portable multifunction device in accordance with some embodiments. Lens and mirror assembly 1000a includes an FP coil 1010a, a pivot 1020a, a magnet 1030a, a mirror 1040a and a hall sensor 1050a. FIG. 10A shows a cross-sectional views through the lens and mirror assembly 1000a assembly, showing the OIS actuator architecture. Magnet 1030a is configured to move with the mirror 1040a. The lens and mirror assembly 1000a incorporates a pivot point 1020a about which the mirror 1040a tilts, and includes a resilient spring 1060a to convert the force for the VCM actuators to a position of the mirror 1040a. There are four coils 1010a mounted to the fixed OIS chassis 1070a portion of the assembly 1000a. These are disposed around the four sides of the magnet. When appropriately driven with electrical signals, the Lorentz forces generated between the coils 1010a and magnet 1030a generate the tilting forces.

Figure 10B:
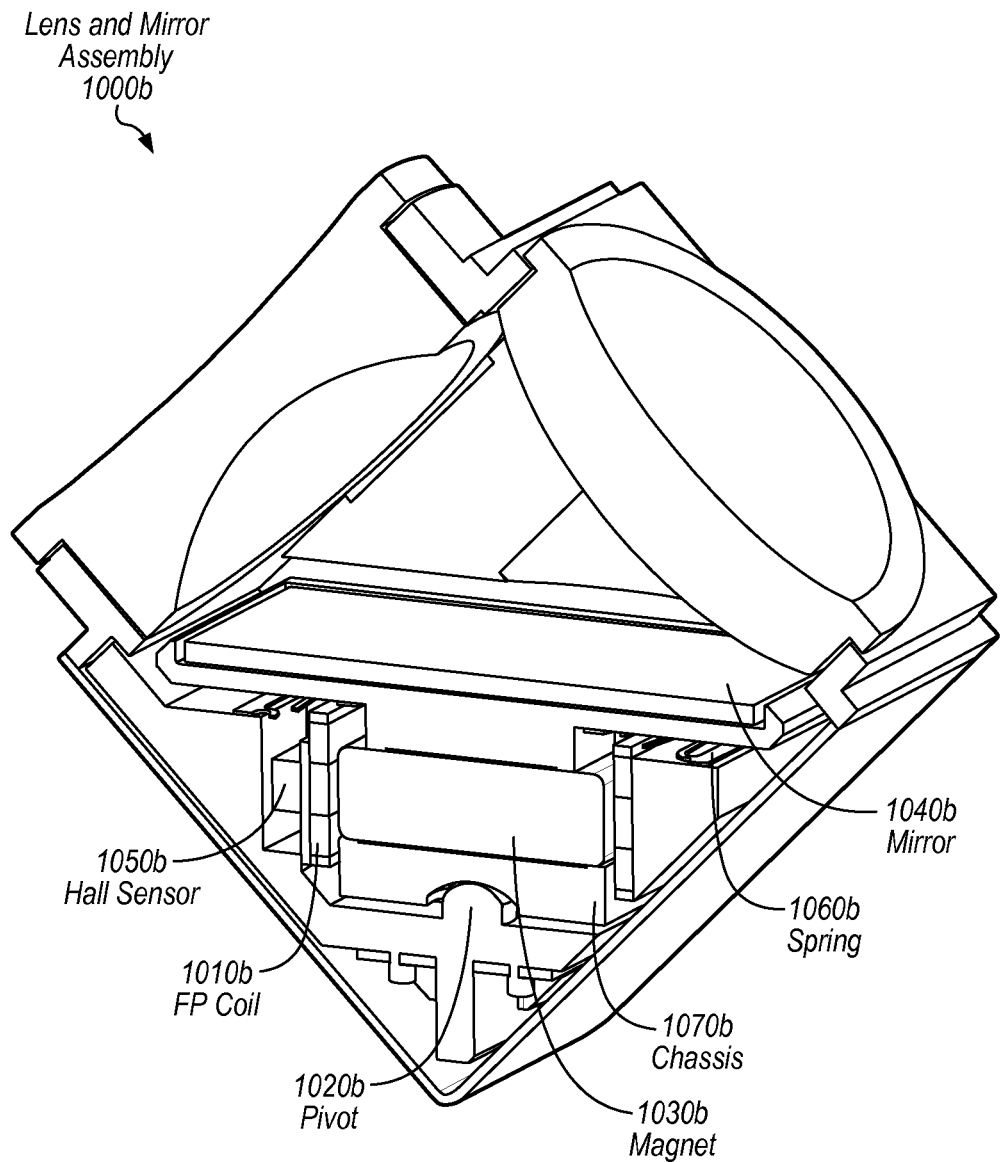
FIG. 10B depicts a cross-sectional view of components of an alternative embodiment of a lens and mirror assembly for a camera for use with in portable multifunction device in accordance with some embodiments.

FIG. 10B depicts a cross-sectional view of components of an alternative embodiment of a lens and mirror assembly for a camera for use with in portable multifunction device in accordance with some embodiments. Lens and mirror assembly 1000a includes an FP coil 1010a, a pivot 1020a, a magnet 1030a, a mirror 1040a and a hall sensor 1050a. FIG. 10B shows a cross-sectional views through the lens and mirror assembly 1000a assembly, showing the OIS actuator architecture. Magnet 1030a is configured to move with the mirror 1040a. The lens and mirror assembly 1000a incorporates a pivot point 1020a about which the mirror 1040a tilts, and includes a resilient spring 1060a to convert the force for the VCM actuators to a position of the mirror 1040a. There are four coils 1010a mounted to the fixed OIS chassis 1070a portion of the assembly 1000a. These are disposed around the four sides of the magnet. When appropriately driven with electrical signals, the Lorentz forces generated between the coils 1010a and magnet 1030a generate the tilting forces.

Figure 11A:
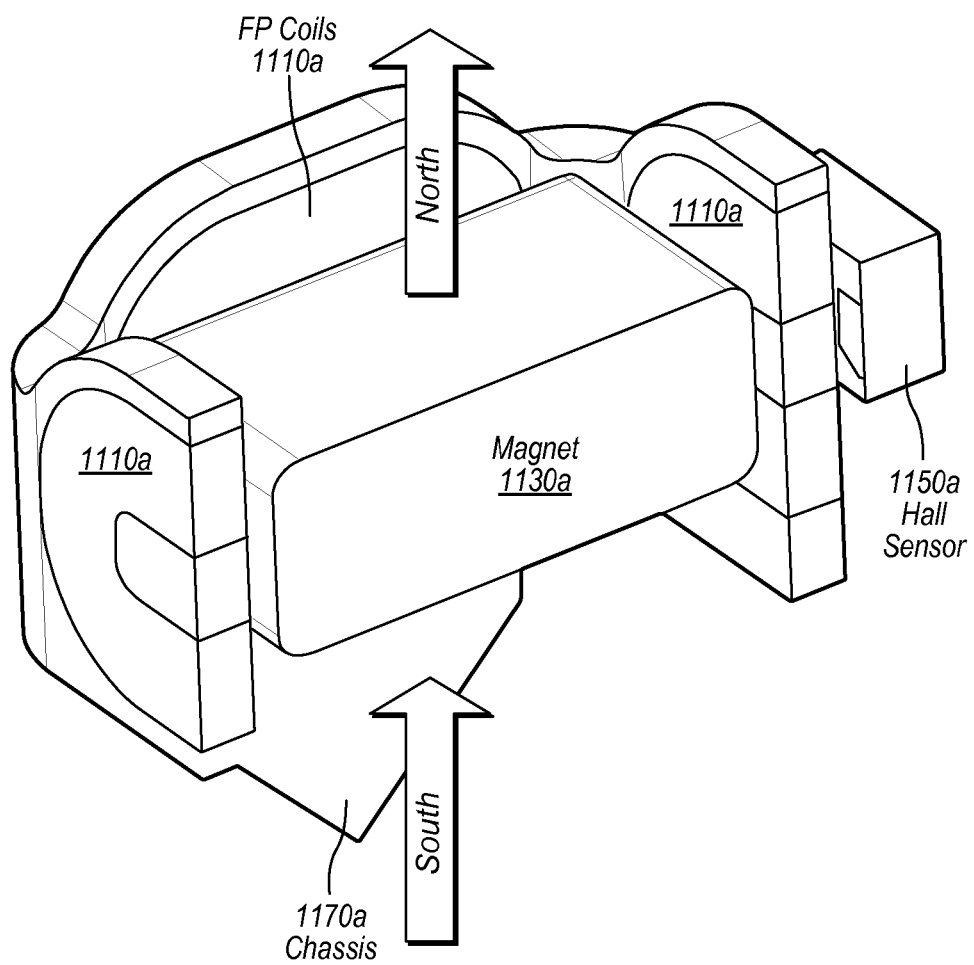
FIG. 11A illustrates a cross-sectional view of a coil and magnet arrangement for a lens and mirror assembly for a camera for use with in portable multifunction device in accordance with some embodiments.

FIG. 11A illustrates a cross-sectional view of a coil and magnet arrangement for a lens and mirror assembly for a camera for use with in portable multifunction device in accordance with some embodiments. A chassis 1170a is attached to a magnet 1130a, hall sensors 1150a and FP coils 1110a. FIG. 11A shows in more detail how the coils 1110a and magnet 1130a (and hall sensors 1150a used to detect or measure the position of the magnet 1130a) are configured relative to each other. The four independent coils 1110a are made from a single component using a Flat Printed Coil (FP Coil) technique. The FP coil 1110a is then folded up. FIG. 11A illustrates how the magnet 1130a is poled, and in this way the Lorentz forces are generated by the fringing field of the magnet, which proceeds around the sides of the magnet from North to South. It is the component of the magnetic field in directions orthogonal to the poling axis of the magnet 1130 that generates the Lorentz forces.

The Hall sensors 1150a, as show in FIG. 11A, are located close to the plane of symmetry of the magnet 1150a orthogonal to the poling direction. At this plane, nominally the Hall sensors 1150a will not produce an output sensing voltage when appropriately driven. However, when the magnet 1130a moves in response to the Lorentz forces from the Coils 1110a, so that the Hall sensors 1150a are no longer on the plane of symmetry, there will be a net magnetic field orthogonal to the poling direction, and this will generate a Hall effect voltage that can be sensed, indicating the magnet 1130a position. Note that in FIG. 11A, the Hall sensors 1150a are not mounted directly to the FPC coil. There is an FPC used to mount the Hall sensors and electrically connect to the FP Coil. This is not shown in FIG. 11A, but is illustrated in as part of the assembly flow discussed below.

Figure 11B:
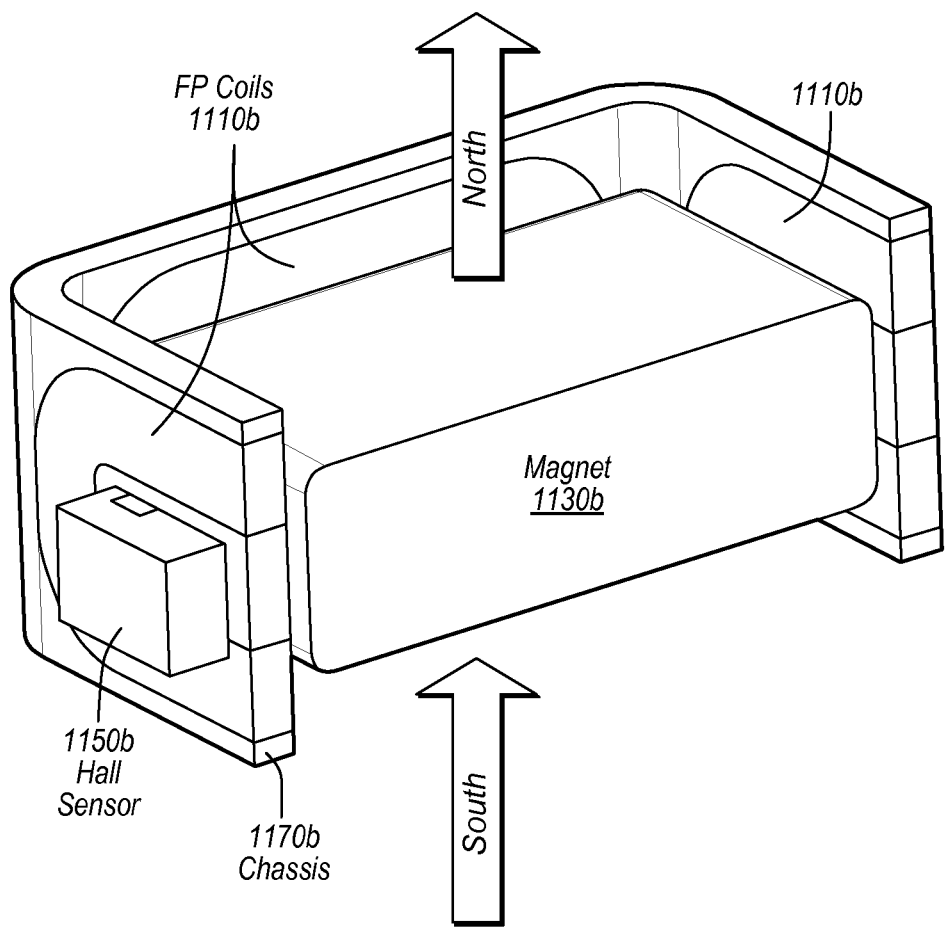
FIG. 11B illustrates a cross-sectional view of an alternative embodiment of a coil and magnet arrangement for a lens and mirror assembly for a camera for use with in portable multifunction device in accordance with some embodiments.

FIG. 11B illustrates a cross-sectional view of a coil and magnet arrangement for a lens and mirror assembly for a camera for use with in portable multifunction device in accordance with some embodiments. A chassis 1170b is attached to a magnet 1130b, hall sensors 1150b and FP coils 1110b. FIG. 11B shows in more detail how the coils 1110b and magnet 1130b (and hall sensors 1150b used to detect or measure the position of the magnet 1130b) are configured relative to each other. The four independent coils 1110b are made from a single component using a Flat Printed Coil (FP Coil) technique. The FP coil 1110b is then folded up. FIG. 11B illustrates how the magnet 1130b is poled, and in this way the Lorentz forces are generated by the fringing field of the magnet, which proceeds around the sides of the magnet from North to South. It is the component of the magnetic field in directions orthogonal to the poling axis of the magnet 1130b that generates the Lorentz forces.

The Hall sensors 1150b, as show in FIG. 11B, are located close to the plane of symmetry of the magnet 1150b orthogonal to the poling direction. At this plane, nominally the Hall sensors 1150b will not produce an output sensing voltage when appropriately driven. However, when the magnet 1130b moves in response to the Lorentz forces from the Coils 1110b, so that the Hall sensors 1150b are no longer on the plane of symmetry, there will be a net magnetic field orthogonal to the poling direction, and this will generate a Hall effect voltage that can be sensed, indicating the magnet 1130b position. Note that in FIG. 11B, the Hall sensors 1150b are not mounted directly to the FPC coil. There is an FPC used to mount the Hall sensors and electrically connect to the FP Coil.

Figure 12A:
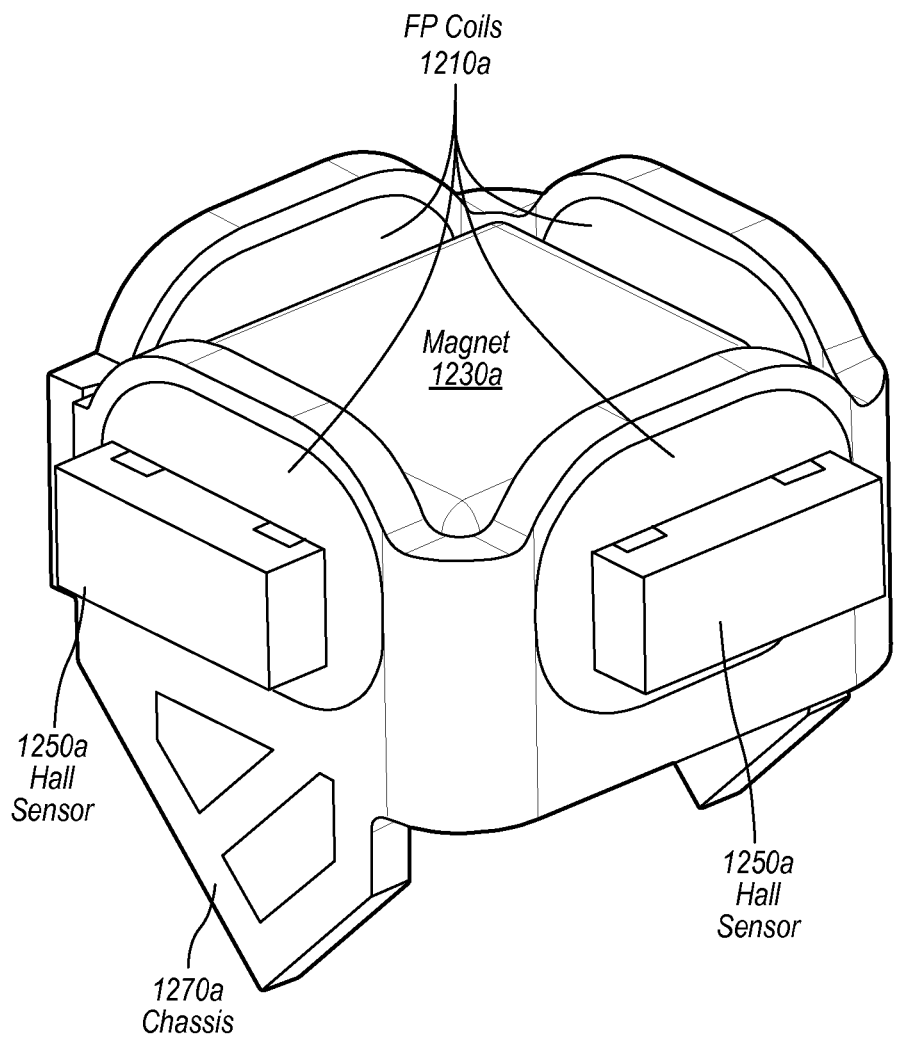
FIG. 12A depicts a coil and magnet arrangement for a lens and mirror assembly for a camera for use with in portable multifunction device in accordance with some embodiments.

FIG. 12A depicts a coil and magnet arrangement for a lens and mirror assembly for a camera for use with in portable multifunction device in accordance with some embodiments. A chassis 1270a is attached to a magnet 1230a, hall sensors 1250a and FP coils 1210a. FIG. 12A shows in more detail how the coils 1210a and magnet 1230a (and hall sensors 1250a used to detect or measure the position of the magnet 1230a) are configured relative to each other. The four independent coils 1210a are made from a single component using a Flat Printed Coil (FP Coil) technique. The FP coil 1210a is then folded up. It is the component of the magnetic field in directions orthogonal to the poling axis of the magnet 1230a that generates the Lorentz forces.

The Hall sensors 1250a, as show in FIG. 12A, are located close to the plane of symmetry of the magnet 1250a orthogonal to the poling direction. At this plane, nominally the Hall sensors 1250a will not produce an output sensing voltage when appropriately driven. However, when the magnet 1230a moves in response to the Lorentz forces from the Coils 1210a, so that the Hall sensors 1250a are no longer on the plane of symmetry, there will be a net magnetic field orthogonal to the poling direction, and this will generate a Hall effect voltage that can be sensed, indicating the magnet 1230a position. Note that in FIG. 12, the Hall sensors 1250a are not mounted directly to the FPC coil. There is an FPC used to mount the Hall sensors and electrically connect to the FP Coil. This is not shown in FIG. 12A, but is illustrated in as part of the assembly flow discussed below.

Figure 12B:
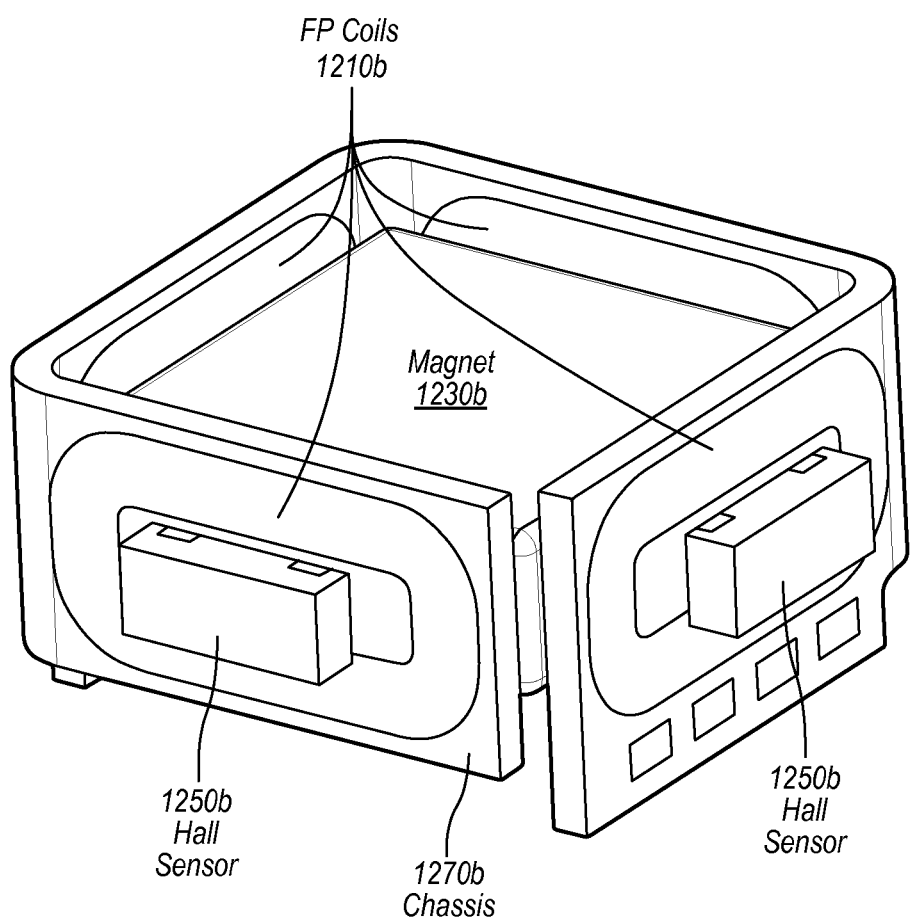
FIG. 12B depicts an alternative embodiment of a coil and magnet arrangement for a lens and mirror assembly for a camera for use with in portable multifunction device in accordance with some embodiments.

FIG. 12B depicts a coil and magnet arrangement for a lens and mirror assembly for a camera for use with in portable multifunction device in accordance with some embodiments. A chassis 1270b is attached to a magnet 1230b, hall sensors 1250b and FP coils 1210b. FIG. 12B shows in more detail how the coils 1210b and magnet 1230b (and hall sensors 1250b used to detect or measure the position of the magnet 1230b) are configured relative to each other. The four independent coils 1210b are made from a single component using a Flat Printed Coil (FP Coil) technique. The FP coil 1210b is then folded up. It is the component of the magnetic field in directions orthogonal to the poling axis of the magnet 1230b that generates the Lorentz forces.

The Hall sensors 1250b, as show in FIG. 12B, are located close to the plane of symmetry of the magnet 1250b orthogonal to the poling direction. At this plane, nominally the Hall sensors 1250b will not produce an output sensing voltage when appropriately driven. However, when the magnet 1230b moves in response to the Lorentz forces from the Coils 1210b, so that the Hall sensors 1250b are no longer on the plane of symmetry, there will be a net magnetic field orthogonal to the poling direction, and this will generate a Hall effect voltage that can be sensed, indicating the magnet 1230b position. Note that in FIG. 12B, the Hall sensors 1250b are not mounted directly to the FPC coil. There is an FPC used to mount the Hall sensors and electrically connect to the FP Coil. This is not shown in FIG. 12B, but is illustrated in as part of the assembly flow discussed below.

Figure 13:
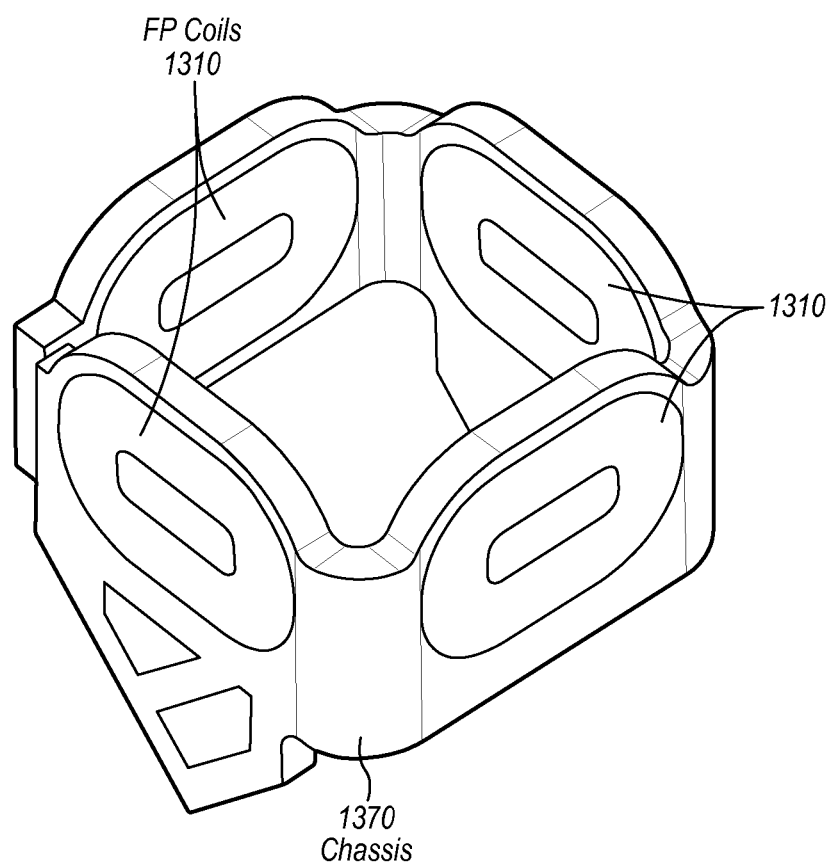
FIG. 13 illustrates components of a coil and magnet arrangement for a lens and mirror assembly for a camera for use with in portable multifunction device in accordance with some embodiments.

FIG. 13 illustrates components of a coil and magnet arrangement for a lens and mirror assembly for a camera for use with in portable multifunction device in accordance with some embodiments. Chassis 1370 with FP coils 1310 is shown.

Figure 14:
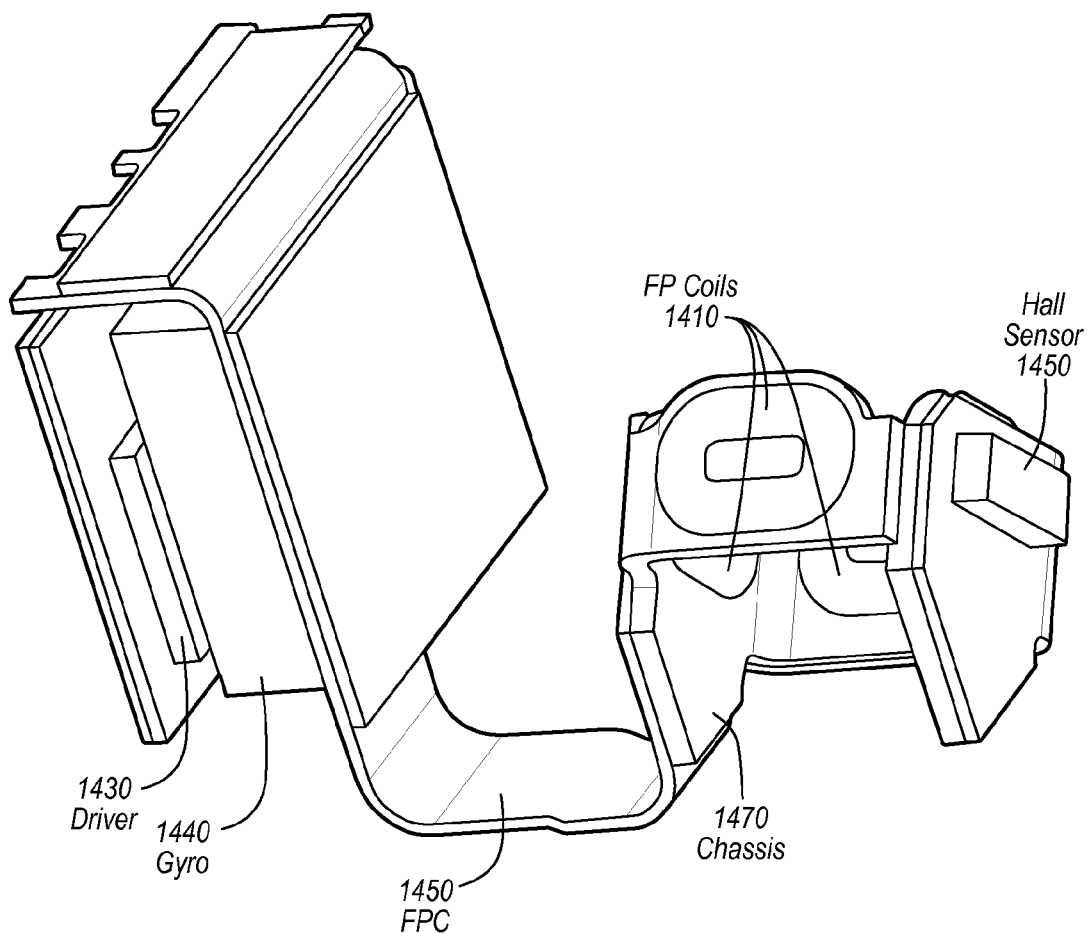
FIG. 14 depicts components of a camera for use with in portable multifunction device in accordance with some embodiments.

FIG. 14 depicts components of a camera for use with in portable multifunction device in accordance with some embodiments. FIG. 14 shows how the FP coil 1410, FPC 1450 with Gyro 1440 and Driver 1430 and other passive components (not shown), and Hall sensors 1450 are mounted inside the fixed OIS chassis, and form the fixed half of the OIS actuator. The OIS Chassis includes a pivot about when the mirror tilts.

Figure 15A:
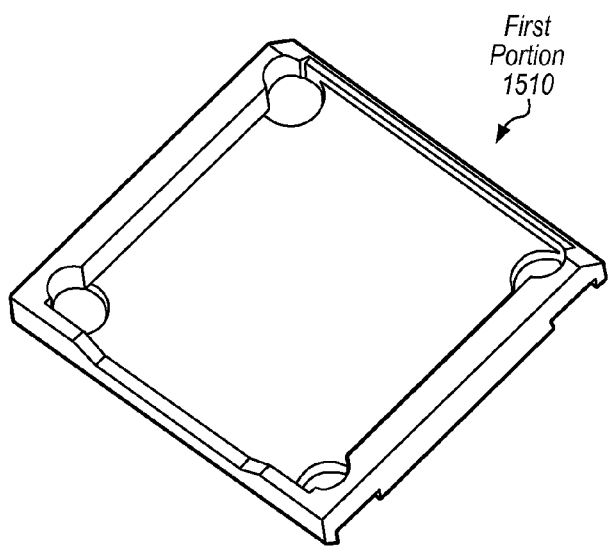
FIGS. 15A-15C illustrate assembly of components of a camera for use with in portable multifunction device in accordance with some embodiments.
Figure 15B:
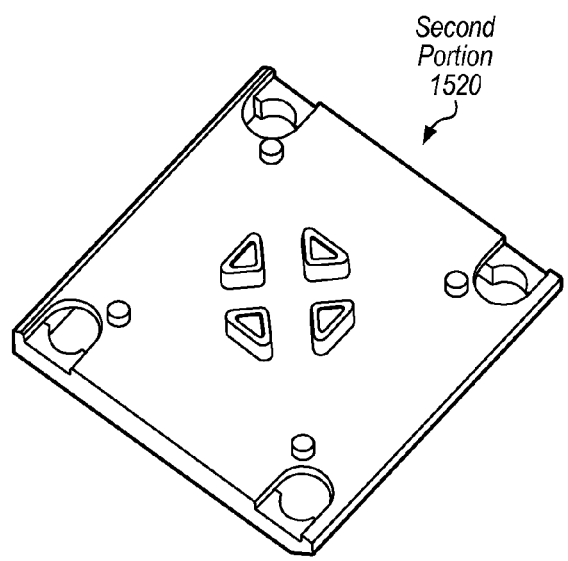
Figure 15C:
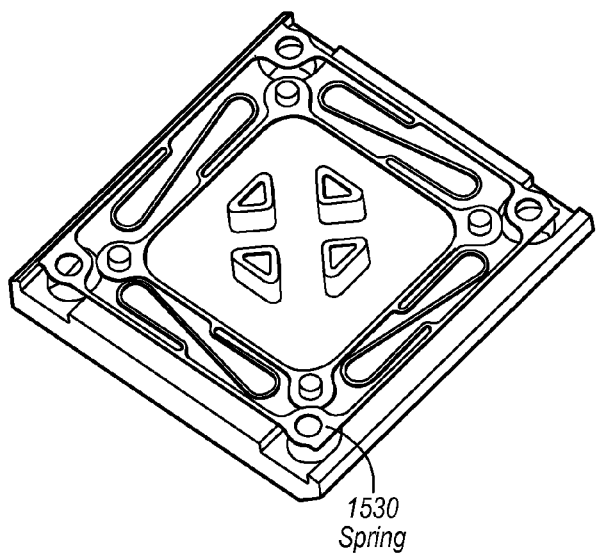

FIGS. 15A-15C illustrate assembly of components of a camera for use with in portable multifunction device in accordance with some embodiments. A first portion 1510, a second portion 1520, and a spring 1530 are shown. FIGS. 15A-15C show the assembly of the moving portion of the OIS actuator, and includes the Moving Pivot and Mirror Mount, which sandwich the Magnet. Note the four L-shaped protrusions on the Moving Pivot that act as the drop-test endstops for the OIS actuator, and prevent the actuator, and particularly the Spring, being damaged during impact. This Configuration of L-shaped protrusions extend through the OIS Chassis and are then retained by two End-stop Plates to realize these features as end-stops to limit the motion separating the halves of the pivot during impact. Note the Spring that is heatstaked to the Mirror Mount.

Figure 16A:
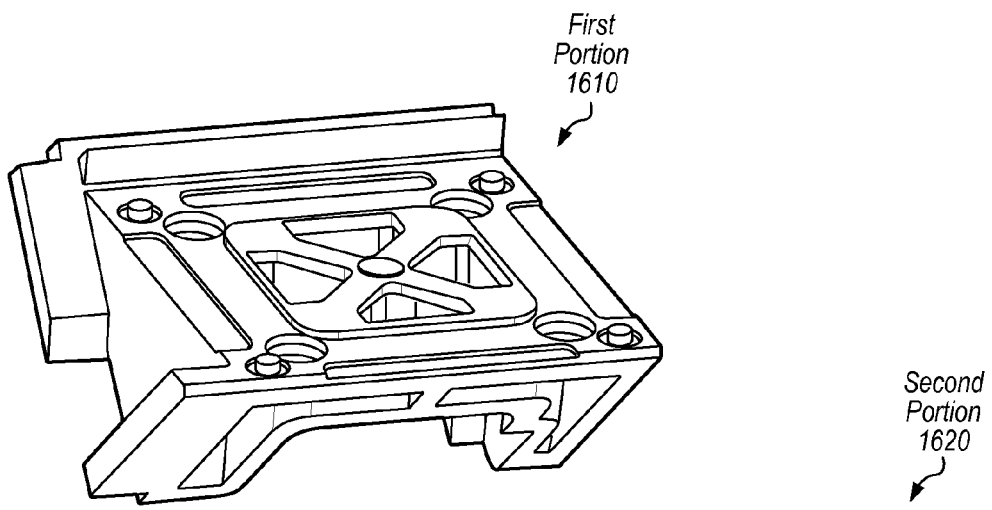
FIGS. 16A-16C depict assembly of components of a camera for use with in portable multifunction device in accordance with some embodiments.
Figure 16B:
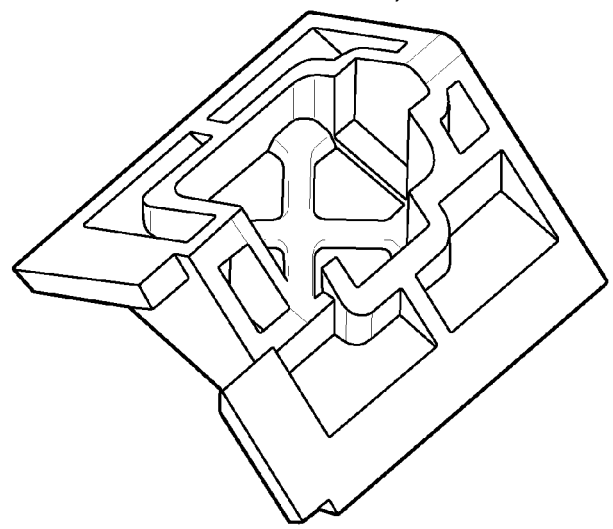
Figure 16C:
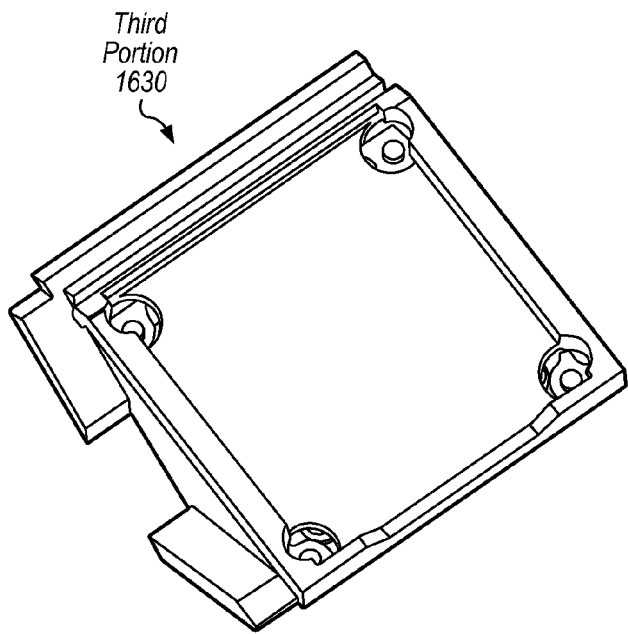

FIGS. 16A-16C depict assembly of components of a camera for use with in portable multifunction device in accordance with some embodiments. A first portion 1610, a second portion 1620, and a third portion 1630 are shown.

Figure 17A:
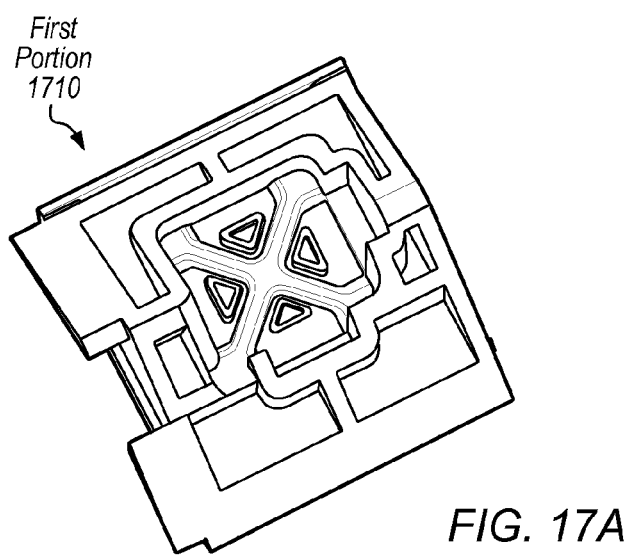
FIGS. 17A-17C illustrate assembly of components of a camera for use with in portable multifunction device in accordance with some embodiments.
Figure 17B:
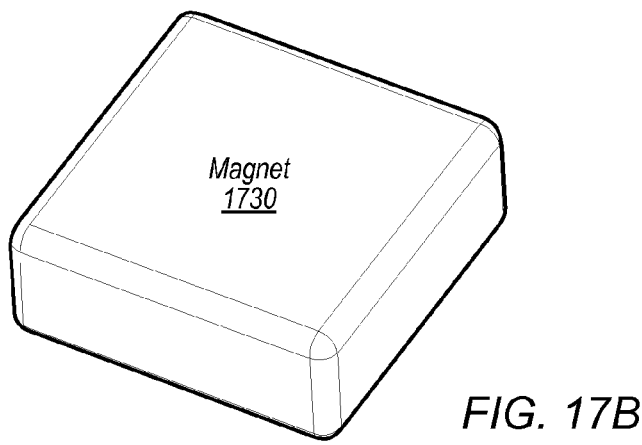
Figure 17C:
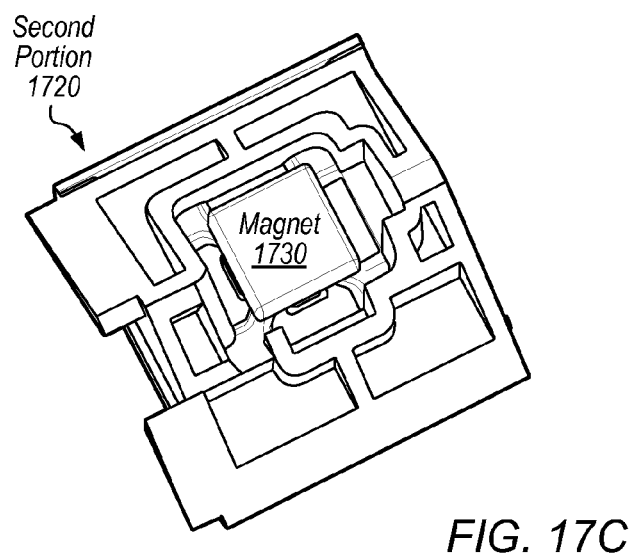

FIGS. 17A-17C illustrate assembly of components of a camera for use with in portable multifunction device in accordance with some embodiments. A first portion 1710, a second portion 1720, and a magnet 1730 are shown.

Figure 18:
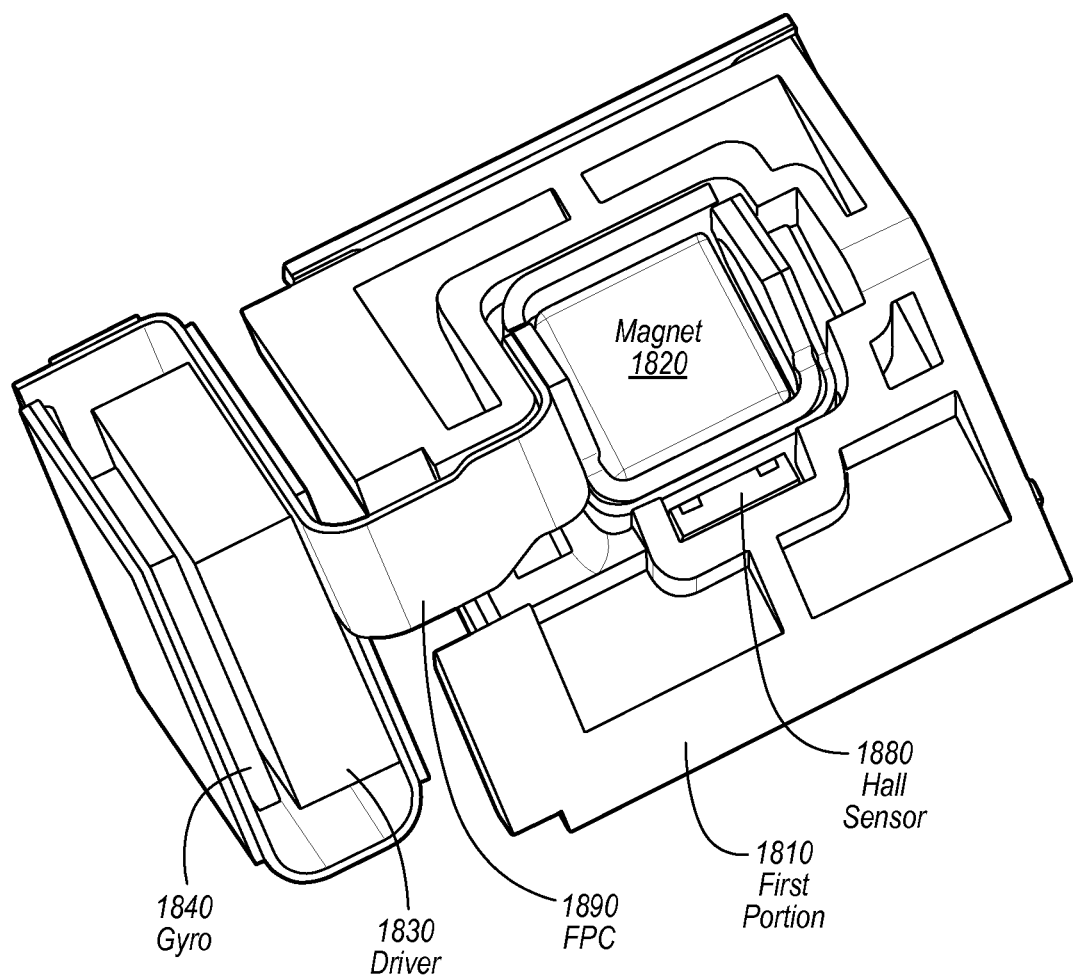
FIG. 18 depicts components of a camera for use with in portable multifunction device in accordance with some embodiments.

FIG. 18 depicts components of a camera for use with in portable multifunction device in accordance with some embodiments. A first portion 1810, a magnet 1820, and a driver 1830, a hall sensor 1880, and an FPC 1890 are shown.

Figure 19:
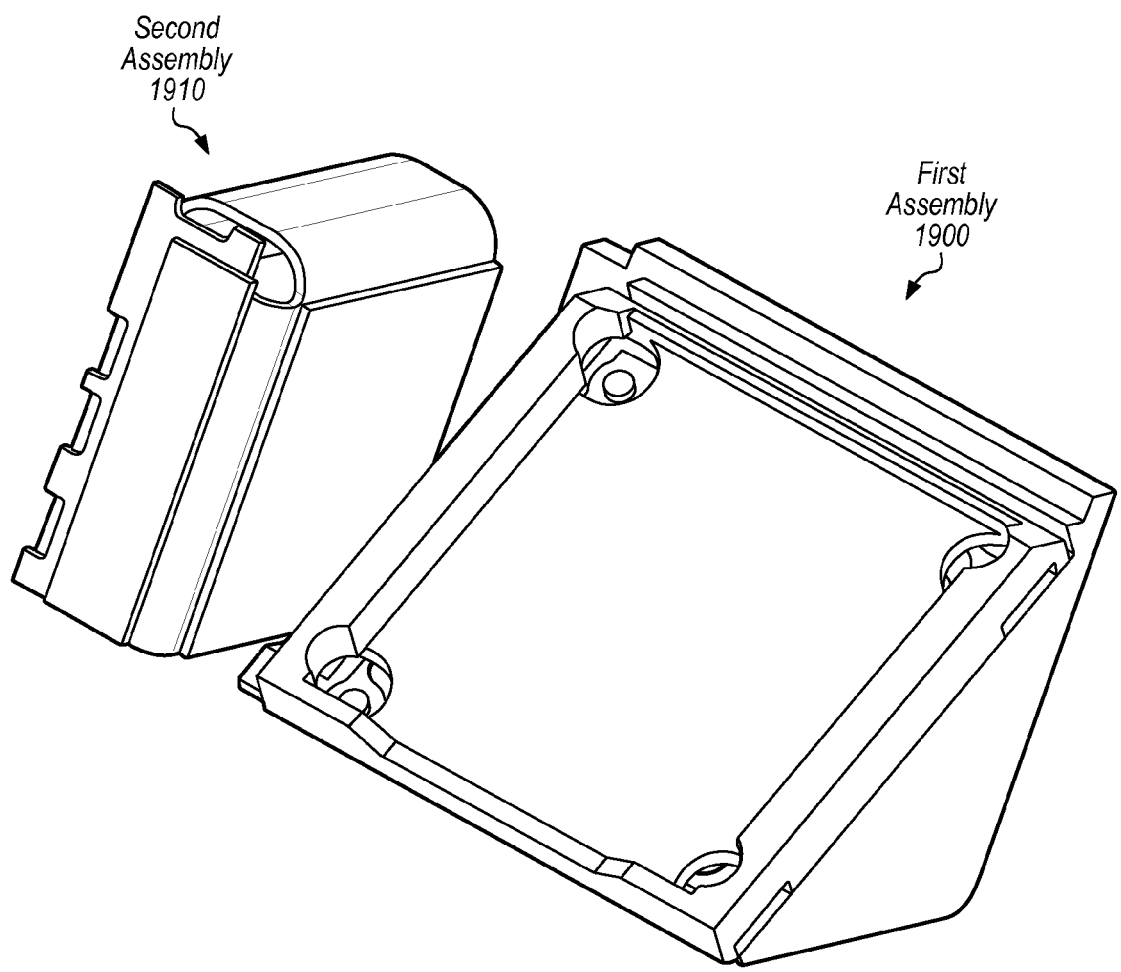
FIG. 19 illustrates components of a camera for use with in portable multifunction device in accordance with some embodiments.

FIG. 19 illustrates components of a camera for use with in portable multifunction device in accordance with some embodiments. A first assembly 1900 and a second assembly 1910 are shown. FIG. 19 illustrates the assembly flow where the moving Magnet assembly is mounted to the fixed OIS Chassis. The Spring is heatstaked to the OIS Chassis through the holes in the Mirror Mount. The End-stop plates are then heatstaked to the OIS Chassis to retain the Moving Pivot. The Mirror is then bonded to the Mirror Mount.

Figure 20:
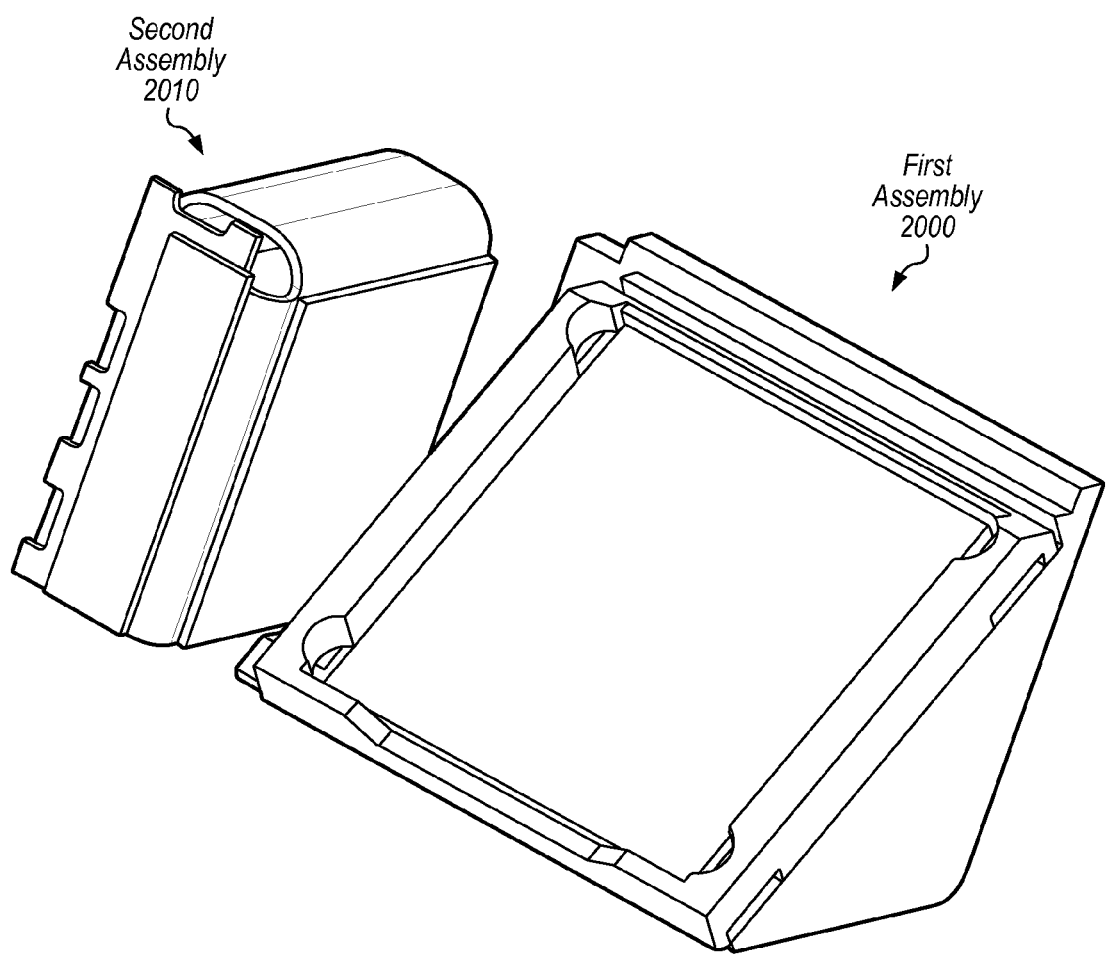
FIG. 20 depicts components of a camera for use with in portable multifunction device in accordance with some embodiments.

FIG. 20 depicts components of a camera for use with in portable multifunction device in accordance with some embodiments. A first assembly 2000 and a second assembly 2010 are shown. FIG. 20 illustrates the assembly flow where the moving Magnet assembly is mounted to the fixed OIS Chassis. The Spring is heatstaked to the OIS Chassis through the holes in the Mirror Mount. The End-stop plates are then heatstaked to the OIS Chassis to retain the Moving Pivot. The Mirror is then bonded to the Mirror Mount.

Figure 21A:
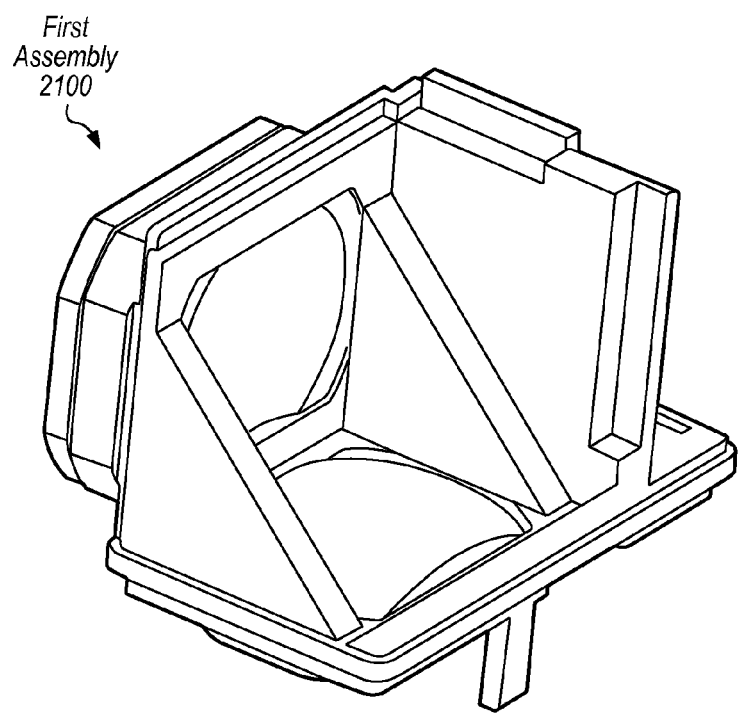
FIG. 21A-21B illustrate components of a camera for use with in portable multifunction device in accordance with some embodiments.
Figure 21B:
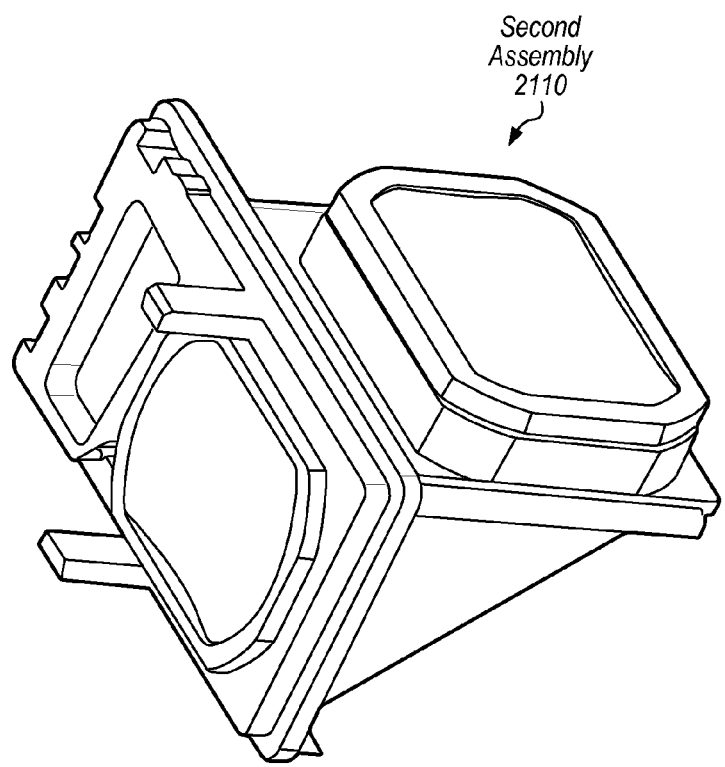

FIGS. 21A-21B illustrate components of a camera for use with in portable multifunction device in accordance with some embodiments. A first assembly 2100 and a second assembly 2110 are shown. FIGS. 21A-21B show the fixed Chassis to which two lens elements are mounts, and to which the OIS mechanism and mirror are bonded. The FPC is then appropriately routed and also bonded to the fixed Chassis.

Figure 22:
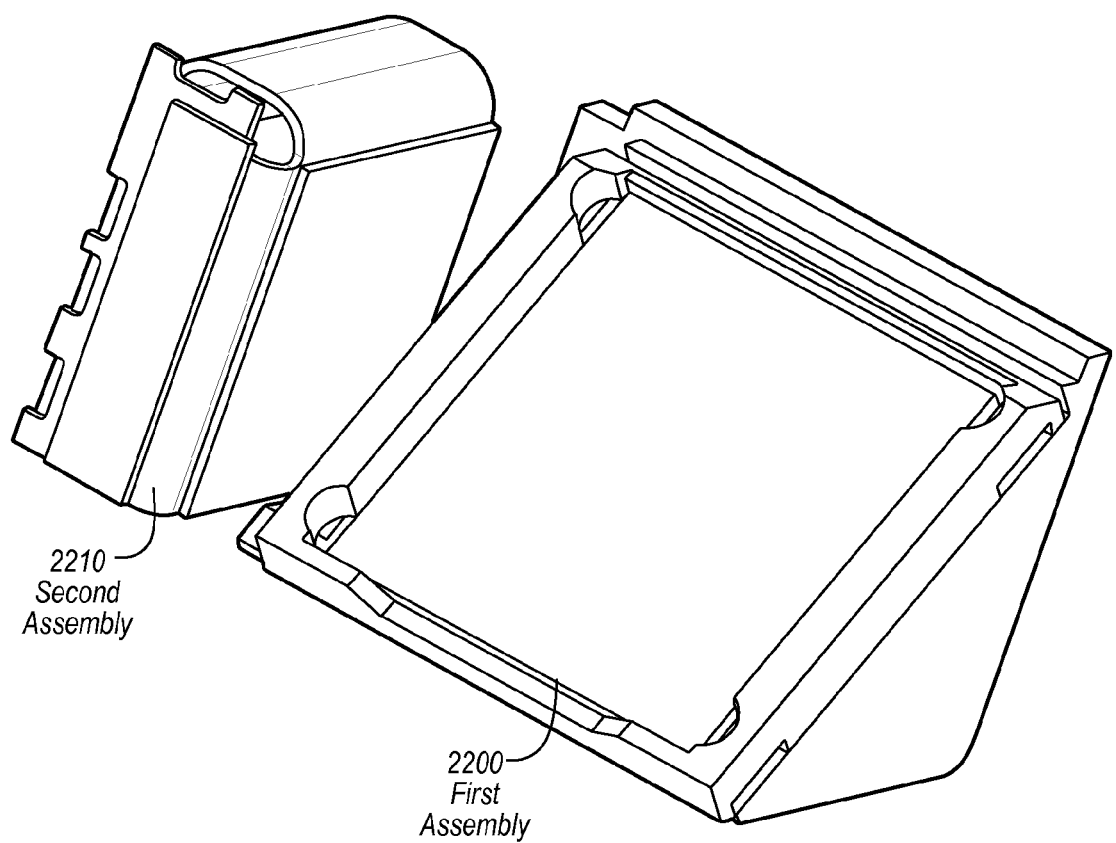
FIG. 22 depicts components of a camera for use with in portable multifunction device in accordance with some embodiments.

FIG. 22 depicts components of a camera for use with in portable multifunction device in accordance with some embodiments. A first assembly 2200 and a second assembly 2210 are shown.

Figure 23:
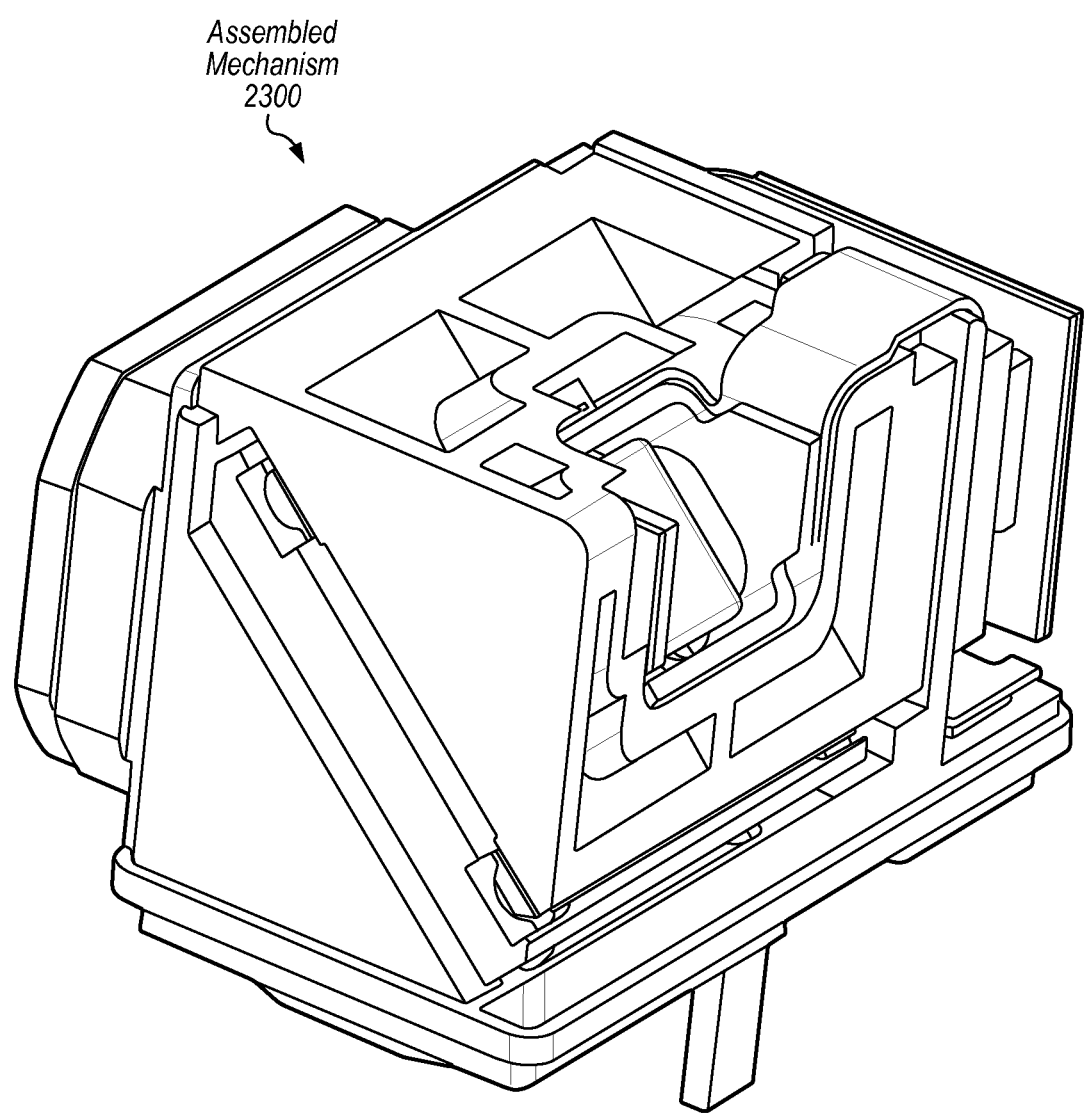
FIG. 23 illustrates components of a camera for use with in portable multifunction device in accordance with some embodiments.

FIG. 23 illustrates components of a camera for use with in portable multifunction device in accordance with some embodiments. FIG. 23 shows an assembled mechanism 2300 containing the fixed Chassis to which two lens elements are mounts, and to which the OIS mechanism and mirror are bonded. The FPC is then appropriately routed and also bonded to the fixed Chassis.

Figure 24:
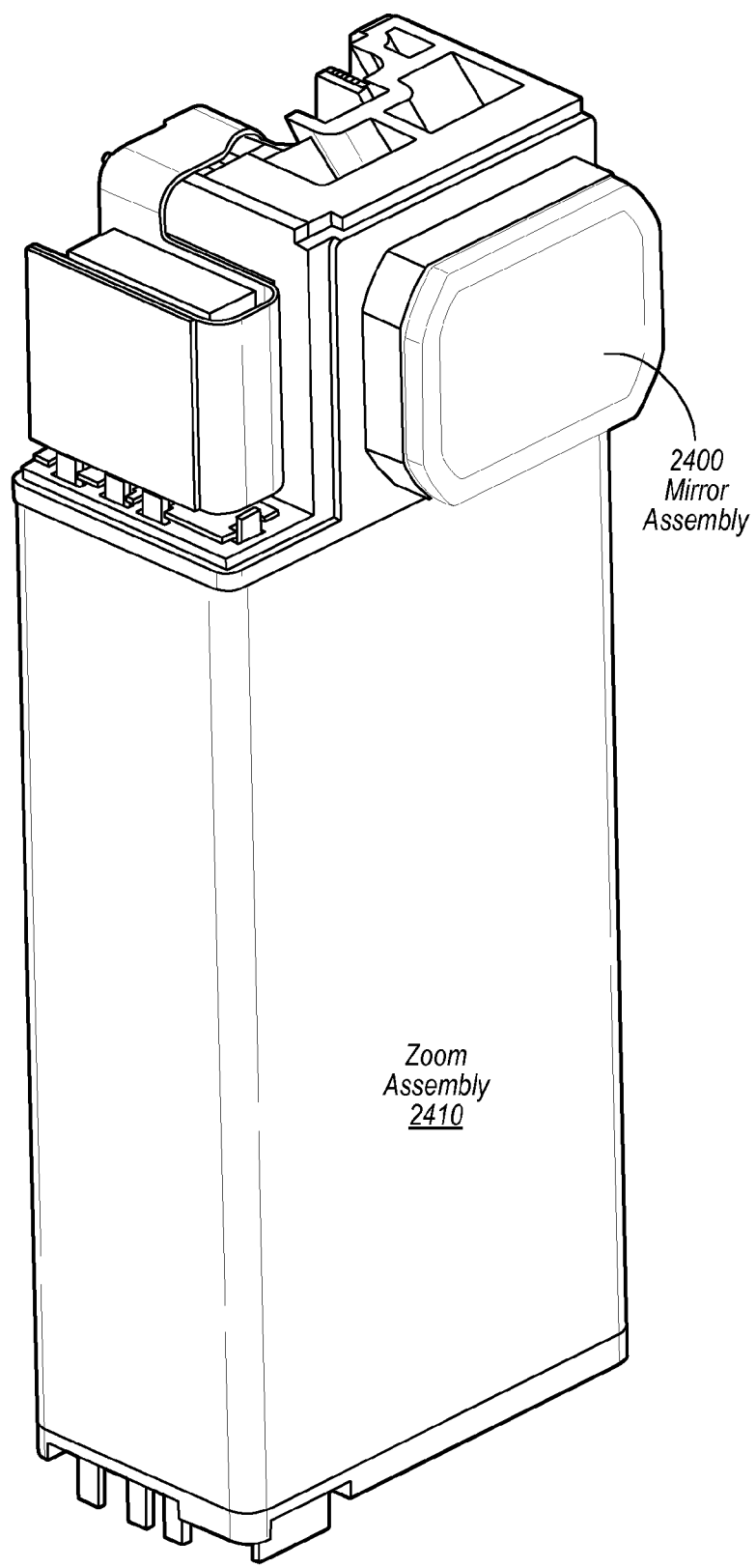
FIG. 24 depicts components of a camera for use with in portable multifunction device in accordance with some embodiments.

FIG. 24 depicts components of a camera for use with in portable multifunction device in accordance with some embodiments. FIG. 24 shows how this whole Mirror Assembly 2400 is joined to the Zoom assembly 2410 and the electrical connections are made to the FPC before the covering can is bonded in place.

Figure 25:
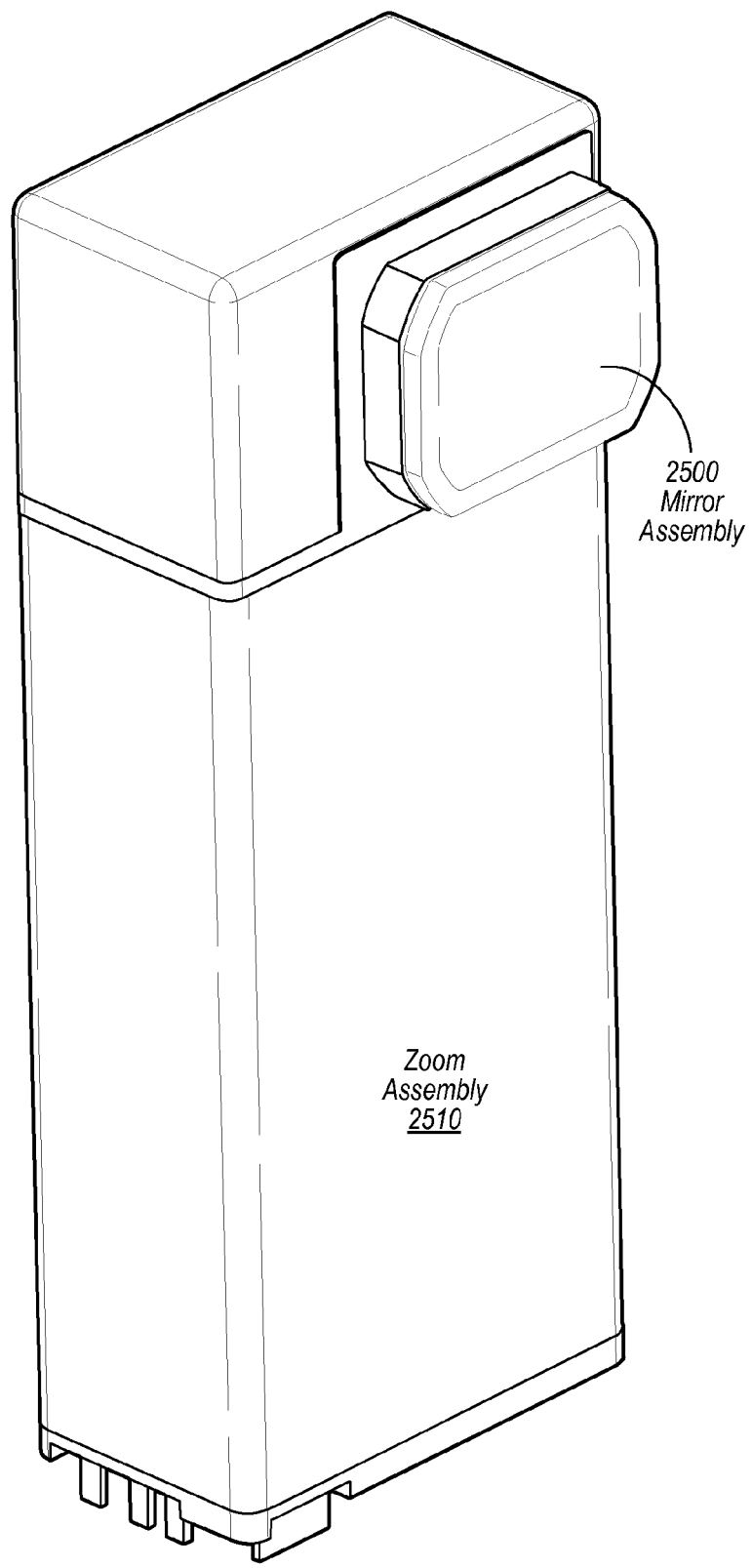
FIG. 25 illustrates components of a camera for use with in portable multifunction device in accordance with some embodiments.

FIG. 25 illustrates components of a camera for use with in portable multifunction device in accordance with some embodiments. FIG. 25 shows how this whole Mirror Assembly 2500 is joined to the Zoom assembly 2510 and with the can bonded in place.

Example Operations

FIG. 26A is a flow diagram illustrating one embodiment of a method for mirror tilt actuation. A mirror for adjusting an optical path of light passing through lens elements of the image capture device is tilted (block 2600).

FIG. 26B is a flow diagram illustrating one embodiment of a method for mirror tilt actuation. Input representing motion of an image capture device is received (block 2610). A mirror for adjusting an optical path of light passing through lens elements of the image capture device is tilted (block 2620).

Example Computer System

Figure 27:
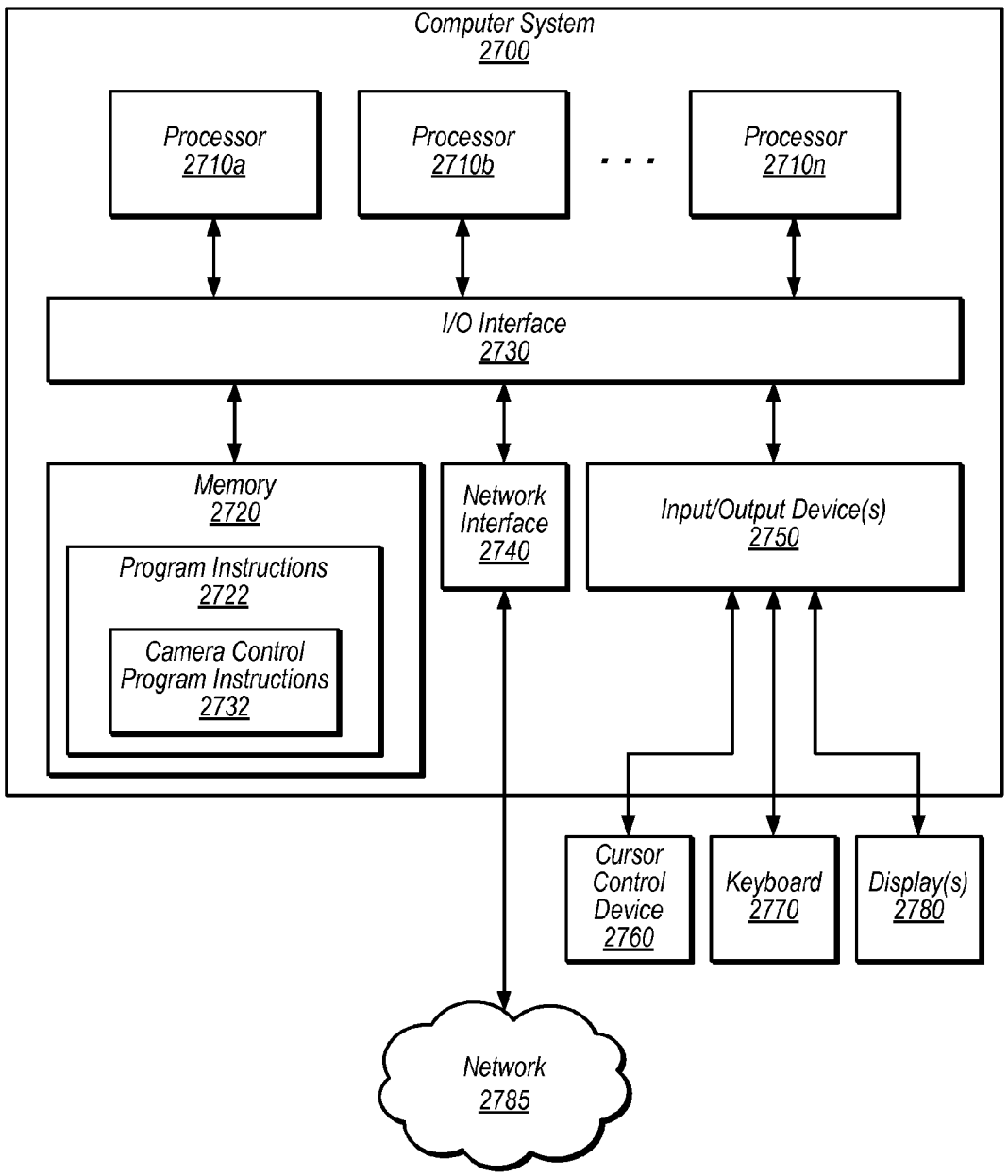
FIG. 27 illustrates an example computer system configured to implement aspects of the system and method for mirror tilt actuation.

FIG. 27 illustrates computer system 2700 that is configured to execute any or all of the embodiments described above. In different embodiments, computer system 2700 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 2700, which may interact with various other devices. Note that any component, action, or functionality described above with respect to FIGS. 1-5 may be implemented on one or more computers configured as computer system 2700 of FIG. 27, according to various embodiments. In the illustrated embodiment, computer system 2700 includes one or more processors 2710 coupled to a system memory 2720 via an input/output (I/O) interface 2730. Computer system 2700 further includes a network interface 2740 coupled to I/O interface 2730, and one or more input/output devices 2750, such as cursor control device 2760, keyboard 2770, and display(s) 2780. In some cases, it is contemplated that embodiments may be implemented using a single instance of computer system 2700, while in other embodiments multiple such systems, or multiple nodes making up computer system 2700, may be configured to host different portions or instances of embodiments. For example, in one embodiment some elements may be implemented via one or more nodes of computer system 2700 that are distinct from those nodes implementing other elements.

In various embodiments, computer system 2700 may be a uniprocessor system including one processor 2710, or a multiprocessor system including several processors 2710 (e.g., two, four, eight, or another suitable number). Processors 2710 may be any suitable processor capable of executing instructions. For example, in various embodiments processors 2710 may be general-purpose or embedded processors implementing any of a variety of instruction set architectures (ISAs), such as the x86, PowerPC, SPARC, or MIPS ISAs, or any other suitable ISA. In multiprocessor systems, each of processors 2710 may commonly, but not necessarily, implement the same ISA.

System memory 2720 may be configured to store program instructions 2722 and/or existing state information and ownership transition condition data 2732 accessible by processor 2710. In various embodiments, system memory 2720 may be implemented using any suitable memory technology, such as static random access memory (SRAM), synchronous dynamic RAM (SDRAM), nonvolatile/Flash-type memory, or any other type of memory. In the illustrated embodiment, program instructions 2722 may be configured to implement a mapping application 2724 incorporating any of the functionality described above. Additionally, existing state information and ownership transition condition data 2732 of memory 2720 may include any of the information or data structures described above. In some embodiments, program instructions and/or data may be received, sent or stored upon different types of computer-accessible media or on similar media separate from system memory 2720 or computer system 2700. While computer system 2700 is described as implementing the functionality of functional blocks of previous Figures, any of the functionality described herein may be implemented via such a computer system.

In one embodiment, I/O interface 2730 may be configured to coordinate I/O traffic between processor 2710, system memory 2720, and any peripheral devices in the device, including network interface 2740 or other peripheral interfaces, such as input/output devices 2750. In some embodiments, I/O interface 2730 may perform any necessary protocol, timing or other data transformations to convert data signals from one component (e.g., system memory 2720) into a format suitable for use by another component (e.g., processor 2710). In some embodiments, I/O interface 2730 may include support for devices attached through various types of peripheral buses, such as a variant of the Peripheral Component Interconnect (PCI) bus standard or the Universal Serial Bus (USB) standard, for example. In some embodiments, the function of I/O interface 2730 may be split into two or more separate components, such as a north bridge and a south bridge, for example. Also, in some embodiments some or all of the functionality of I/O interface 2730, such as an interface to system memory 2720, may be incorporated directly into processor 2710.

Network interface 2740 may be configured to allow data to be exchanged between computer system 2700 and other devices attached to a network 2785 (e.g., carrier or agent devices) or between nodes of computer system 2700. Network 2785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2750 may, in some embodiments, include one or more display terminals, keyboards, keypads, touchpads, scanning devices, voice or optical recognition devices, or any other devices suitable for entering or accessing data by one or more computer systems 2700. Multiple input/output devices 2750 may be present in computer system 2700 or may be distributed on various nodes of computer system 2700. In some embodiments, similar input/output devices may be separate from computer system 2700 and may interact with one or more nodes of computer system 2700 through a wired or wireless connection, such as over network interface 2740.

As shown in FIG. 27, memory 2720 may include program instructions 2722, which may be processor-executable to implement any element or action described above. In one embodiment, the program instructions may implement the methods described above, such as the methods illustrated by FIG. 8. In other embodiments, different elements and data may be included. Note that data 2732 may include any data or information described above.

Those skilled in the art will appreciate that computer system 2700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2700 may be transmitted to computer system 2700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A camera, the camera comprising:
    an image sensor;
    a zoom lens assembly comprising a plurality of movable lens elements arranged to be moved independent of one another, wherein
        the plurality of movable lens elements share an optical axis, and
        the moveable lens elements are moveable along the optical axis with respect to both one another and the image sensor; and
    a lens and mirror assembly for admitting light to the camera, wherein
        the lens and mirror assembly includes a folded optics arrangement such that light enters the lens and mirror assembly through a first lens with an optical axis of the first lens orthogonal to the plurality of moveable lens elements,
        the lens and mirror assembly comprises a mirror for folding a path of light from the optical axis of the first lens to the optical axis of the plurality of movable lens elements,
        the lens and mirror assembly further comprises an actuator configured to tilt the mirror to stabilize an image captured by the image sensor.

2. The camera of claim 1, wherein the actuator is attached to a driver circuit for tilting the mirror to compensate for user hand motion.

3. The camera of claim 1, wherein the actuator is attached to a driver circuit for tilting the mirror to stabilize an image captured by the image sensor.

4. The camera of claim 1, wherein the actuator comprises:
a magnet, and
non-moving coils disposed around sides of the magnet, wherein
when driven with electric signals, the non-moving coils generate Lorentz forces that tend to tilt the magnet.

5. The camera of claim 1, wherein the actuator comprises:
a moving magnet, and
four non-moving coils disposed around four sides of the magnet, wherein
when driven with electric signals, the four non-moving coils generate Lorentz forces that tend to tilt the magnet and the mirror.

6. The camera of claim 1, wherein the actuator comprises:
a moving magnet, and
non-moving coils disposed around sides of the magnet, wherein
when driven with electric signals, the non-moving coils generate Lorentz forces that tend to tilt the magnet and the mirror about a pivot.

7. The camera of claim 6, wherein a fringing field of the moving magnet includes components of magnetic field in the appropriate directions to deliver the Lorentz forces, when the coils are electrically driven.

8. A system, comprising:
a plurality of moveable lens elements, wherein
the plurality of movable lens elements share an optical axis, and
the moveable lens elements are moveable along the optical axis with respect to one another;
a mirror situated in an optical path of light passing through the lens elements; and
an actuator configured to tilt the mirror to stabilize an image generated from the light, wherein
the actuator comprises:
a moving magnet, and
four non-moving coils disposed around four sides of the magnet, wherein
when driven with electric signals, the four non-moving coils generate Lorentz forces that tend to tilt the magnet and the mirror about a pivot.

9. The system of claim 8, wherein the four coils are fabricated in a single component layer-by-layer in sheet form using various process including plating.

10. The system of claim 8, wherein the actuator for tilting the mirror further comprises at least two hall sensors for monitoring the motion of the magnet in two orthogonal directions.

11. The system of claim 8, wherein the actuator for tilting the mirror further comprises a resilient spring that acts to return the magnet assembly including mirror to its center position, and hence acts to convert the Lorentz forces from the coils to steady state positions.

12. The system of claim 8, wherein the actuator for tilting the mirror comprises an actuator synchronized to compensate for user hand motion to stabilize an image generated from the light and improve quality of the image.

13. The system of claim 8, wherein the actuator for tilting the mirror comprises an actuator synchronized to compensate for user hand motion.

14. The system of claim 8, wherein the actuator comprises
a moveable magnet, and
a plurality of stationary coils disposed around sides of the magnet.

15. The system of claim 8, wherein the actuator is configured to receive electrical signals causing generation of Lorentz forces that tend to tilt the magnet and mirror.

16. The system of claim 8, wherein the actuator is configured to be receive electrical signals causing generation of Lorentz forces that tend to tilt the magnet and mirror about a pivot in two substantially orthogonal tilt degrees of freedom.

17. The system of claim 8, wherein a fringing field of the magnet includes components of magnetic field in the appropriate directions to deliver Lorentz forces, such that when the coils are electrically driven, said fringing field interacts with the coils at levels on average in different directions for each coil.

18. A non-transitory, computer-readable storage medium, storing program instructions executable on a computer to implement:
receiving input representing motion of an image capture device comprising plurality of lens elements moveable with respect to one another and with respect to an image sensor along an optical axis shared by the lens elements and the image sensor; and
control tilting of a mirror relative to an optical path of light passing through the lens elements of the image capture device to compensate for the motion.

19. The non-transitory computer readable storage medium of claim 18, wherein tilting the mirror for adjusting the optical path of the light comprises adjusting the optical path of the light to compensate for user hand motion to stabilize an image generated from the light and improve quality of the image.

20. The non-transitory computer readable storage medium of claim 18, wherein tilting the mirror for adjusting the optical path of the light comprises creating electrical signals for generation of Lorentz forces that tend to tilt the magnet and mirror.

* * * * *